(12) United States Patent
Cheng

(10) Patent No.: US 9,806,816 B2
(45) Date of Patent: Oct. 31, 2017

(54) RE-MODULATION CROSSTALK AND INTENSITY NOISE CANCELLATION IN WAVELENGTH-DIVISION MULTIPLEXING (WDM) PASSIVE OPTICAL NETWORKS (PONS)

(71) Applicant: Futurewei Technologies, Inc., Plano, TX (US)

(72) Inventor: Ning Cheng, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 44 days.

(21) Appl. No.: 14/872,563

(22) Filed: Oct. 1, 2015

(65) Prior Publication Data

US 2016/0105251 A1   Apr. 14, 2016

Related U.S. Application Data

(60) Provisional application No. 62/062,658, filed on Oct. 10, 2014.

(51) Int. Cl.
*H04J 14/00* (2006.01)
*H04B 10/2575* (2013.01)
*H04B 10/2587* (2013.01)
*H04J 14/02* (2006.01)

(52) U.S. Cl.
CPC ... *H04B 10/25759* (2013.01); *H04B 10/2587* (2013.01); *H04J 14/0242* (2013.01)

(58) Field of Classification Search
CPC ........... H04B 10/25759; H04B 10/2587; H04J 14/0242

USPC .......................................................... 398/68
See application file for complete search history.

(56) References Cited

U.S. PATENT DOCUMENTS

| 5,903,615 A * | 5/1999 | Thomson ............... H04B 1/123 365/73 |
| 8,417,118 B2 | 4/2013 | Bai |
| 2010/0189445 A1* | 7/2010 | Nakashima ............ H04B 10/60 398/152 |
| 2010/0226422 A1* | 9/2010 | Taubin .................. H04L 25/497 375/231 |
| 2011/0206109 A1* | 8/2011 | Agazzi ................ H03M 1/0604 375/229 |
| 2011/0261865 A1* | 10/2011 | Chen ................. H04L 25/03057 375/220 |

(Continued)

OTHER PUBLICATIONS

Zhou, L., et al., "Cost Effective Self-Seeded WDM Mobile Fronthaul with Adaptive Crosstralk Cancellation and Bit Loading OFDM," Asia Communications and Photonics Conference, 2015, 3 pages.

(Continued)

*Primary Examiner* — Juan A Torres
(74) *Attorney, Agent, or Firm* — Conley Rose, P.C.

(57) ABSTRACT

An apparatus comprising a signal generator configured to produce a modulation signal, a filter coupled to the signal generator and configured to filter the modulation signal to produce a cancellation signal, and a reflective semiconductor optical amplifier (RSOA) coupled to the signal generator and the filter, wherein the RSOA is configured to generate an optical signal according to a difference between the modulation signal and the cancellation signal and transmit the optical signal towards a partial reflection mirror (PRM).

20 Claims, 19 Drawing Sheets

(56) References Cited

U.S. PATENT DOCUMENTS

| | | | | |
|---|---|---|---|---|
| 2012/0269516 | A1* | 10/2012 | Liu | H04B 10/2503 398/72 |
| 2013/0267240 | A1* | 10/2013 | Fu | H04L 1/0026 455/452.2 |
| 2013/0329633 | A1* | 12/2013 | Dalela | H04L 12/4633 370/328 |
| 2014/0031049 | A1* | 1/2014 | Sundaresan | H04W 16/02 455/447 |
| 2014/0064733 | A1* | 3/2014 | Liu | H04B 10/506 398/79 |

OTHER PUBLICATIONS

Chang, et al., "Key Technologies of WDM-PON for Future Converged Optical Broadband Access Networks [Invited]," J. Opt. Commun. Netw. vol. 1, No. 4, Sep. 2009, C35-050.

Cheng, et al., "Efficient Mobile Fronthaul for 24x20MHz LTE Signals Using Self-Seeded RSOA with Adaptive Crosstalk Cancellation," LTE Signals, Sep. 27, 2015, 3 pages.

Cheng, et al., "Feedforward Cancellation of Remodulation Crosstalk in WDM PON Using Self-Seeded RSOAs," LTE Signals, Jun. 28, 2015, 3 pages.

"CPRI Specification V6.1, Common Public Radio Interface (CPRI); Interface Specification," Jul. 1, 2014, 129 pages.

Deng, et al., "Self-seeding-based 10Gb/s over 25km optical OFDM transmissions utilizing face-to-face dual-RSOAs at gain saturation," Optical Society of America, May 9, 2014, 12 pages.

Iwatsuki, et al., "Applications and Technical Issues of Wavelength-Division Multiplexing Passive Optical Networks With Colorless Optical Network Units [Invited]," J. Opt. Commun. Netw., vol. 1, No. 4, Sep. 2009, pp. C17-C24.

Kazovsky, et al., "Next-Generation Optical Access Networks," Journal of Lightwave Technology, vol. 25, No. 11, Nov. 2007, pp. 3428-3442.

Kim, et al., "A Low-Cost WDM Source with an ASE Injected Fabry—Perot Semiconductor Laser," IEEE Photonics Technology Letters, Vol. 12, No. 8, Aug. 2000, pp. 1067-1069.

Komljenovic, et al., "47-km 1.25-Gbps transmission using a self-seeded transmitter with a modulation averaging reflector," Optics Express, vol. 20, No. 16, Jul. 16, 2012, pp. 17386-17392.

Liu, et al., "Demonstration of Bandwidth-Efficient Mobile Fronthaul Enabling Seamless Aggregation of 36 E-UTRA-Like Wireless Signals in a Single 1.1-GHz Wavelength Channel," M2J.2.pdf, Optical Society of America, 2015, 3 pages.

Ma, et al., "Demonstration of CPRI over Self-Seeded WDM-PON in Commercial LTE Environment," M2J.6 pdf, Optical Society of America, 3 pages, 2015.

Martinelli, et al., "Polarization in Retracing Circuits for WDM-PON," IEEE Photonics Technology Letters, vol. 24, No. 14, Jul. 15, 2012, pp. 1191-1193.

Pachnicke, et al., "First Demonstration of a Full C-Band Tunable WDM-PON System with Novel High-Temperature DS-DBR Lasers," Optical Society of America, W3G.2.pdf, 3 pages, 2014.

Parolari, et al., "C- and O-Band Operation of RSOA WDM PON Self-Seeded Transmitters up to 10 Gb/s [Invited]," J. Opt. Commun. Netw., vol. 7, No. 2, Feb. 2015, pp. A249-255.

Parolari, et al., "Operation of a RSOA WDM PON Self-seeded Transmitter Over More than 50 km of SSMF up to 10 Gb/s," W3G.4.pdf, Optical Society of America, 3 pages, 2014.

Pfeiffer, "Next Generation Mobile Fronthaul Architectures," M2.1.7.pdf, Optical Society of America, 3 pages, 2015.

Pizzinat, et al., "Things You Should Know About Fronthaul," Journal of Lightwave Technology, vol. 33, No. 5, Mar. 1, 2015 1077-1083.

Prat, et al., "Optical Network Unit Based on a Bidirectional Reflective Semiconductor Optical Amplifier for Fiber-to-the-Home Networks," IEEE Photonics Technology Letters, vol. 17, No. 1, Jan. 2005, pp. 250-252.

Presi, et al., "Stable self-seeding of R-SOAs for WDM-PONs," OMP4.pdf, Optical Society of America, OSA/OFC/NFOEC, Mar. 6, 2011, 3 pages.

Ramantas, et al., "New Unified PON-RAN Access Architecture for 4G LTE Networks," J. Opt. Commun. Netw., vol. 6, No. 10, Oct. 2014, pp. 890-900.

Saliou, et al., "SelfSeeded RSOAs WDM PON Field Trial for Business and Mobile Fronthaul Applications," M2A.2.pdf, Optical Society of America, OFC, 2015, 3 pages.

Wong, et al., "Directly Modulated Self-Seeding Reflective Semiconductor Optical Amplifiers as Colorless Transmitters in Wavelength Division Multiplexed Passive Optical Networks," Journal of Lightwave Technology, vol. 25, No. 1, Jan. 2007, pp. 67-74.

Wong, et al., "Next-Generation Broadband Access Networks and Technologies," Journal of Lightwave Technology, vol. 30, No. 4, Feb. 15, 2012, pp. 597-608.

Xiong, et al., "Characterization of Directly Modulated Self-Seeded Reflective Semiconductor Optical Amplifiers Utilized as Colorless Transmitters in WDM-PONs," Journal of Lightwave Technology, vol. 31, No. 11, Jun. 1, 2013, pp. 1727-1733.

* cited by examiner

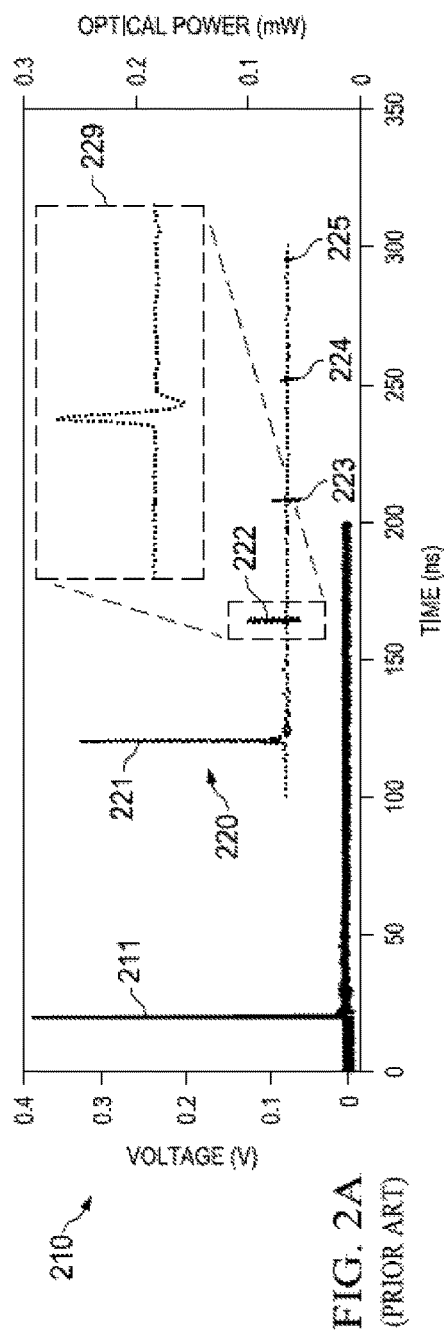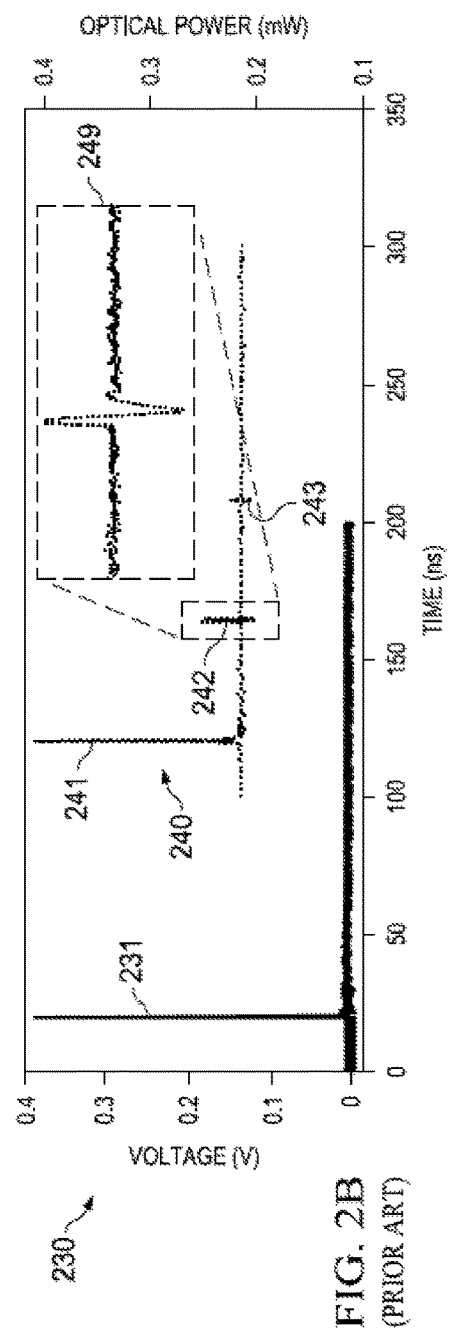
FIG. 2A (PRIOR ART)
FIG. 2B (PRIOR ART)

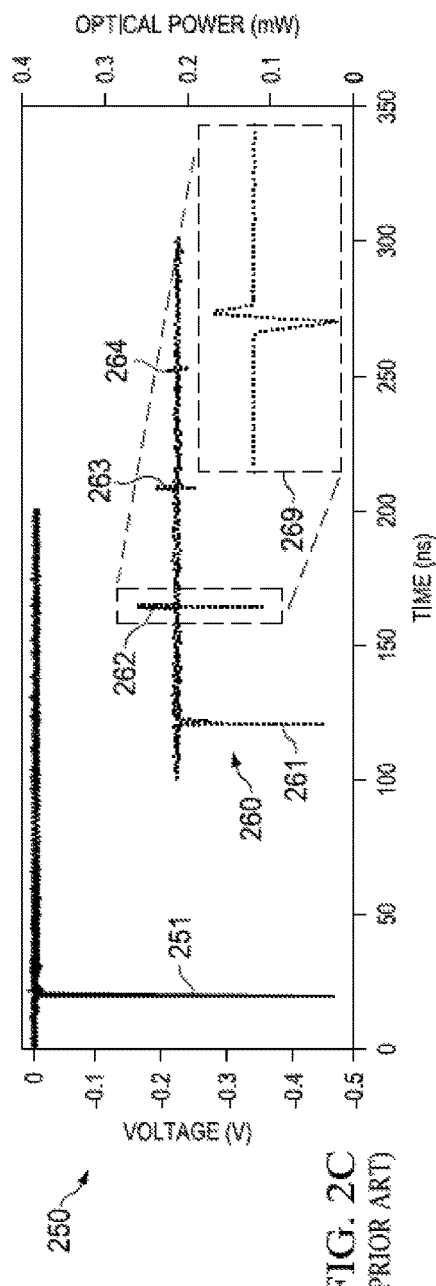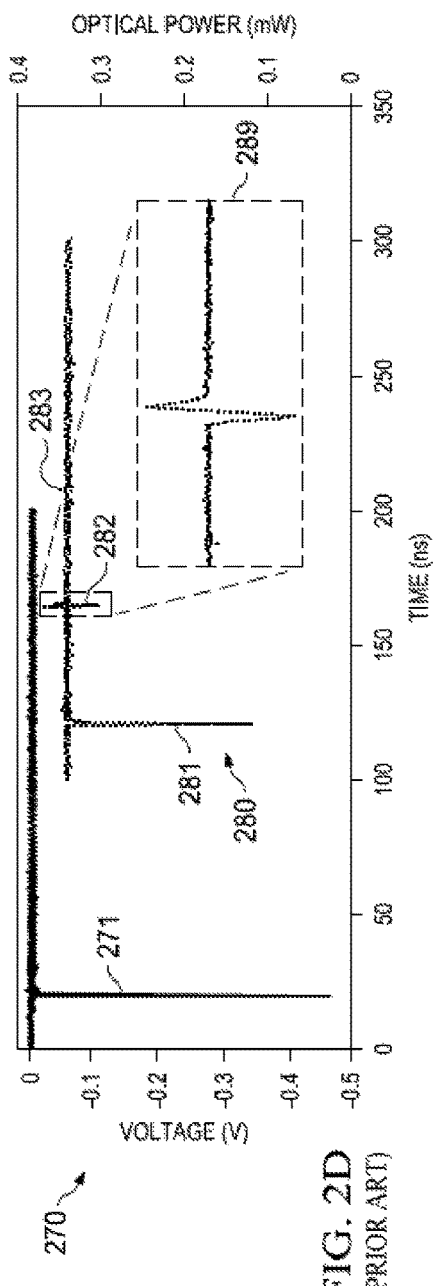
FIG. 2C (PRIOR ART)
FIG. 2D (PRIOR ART)

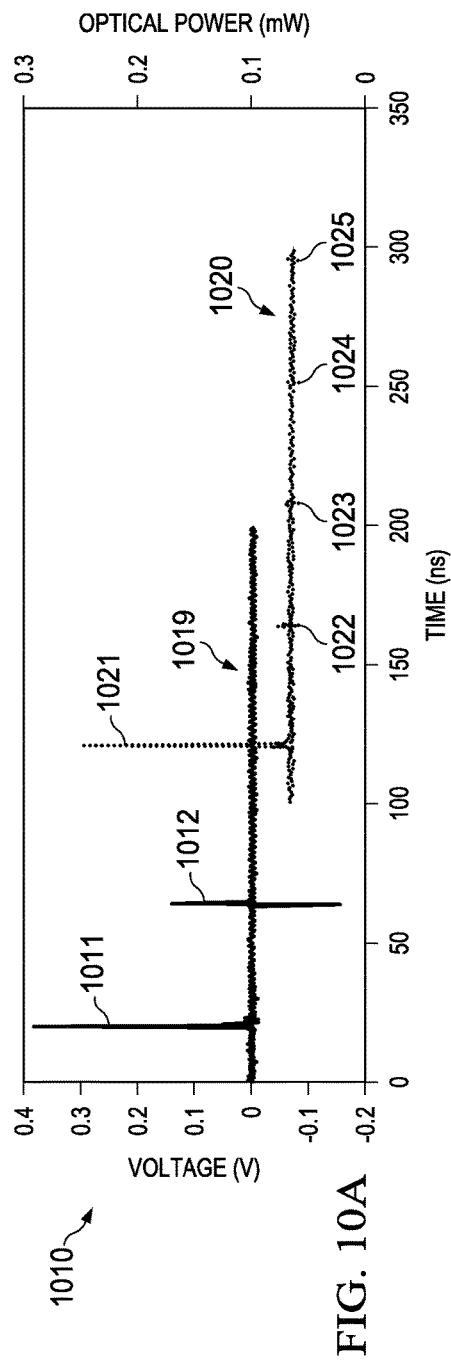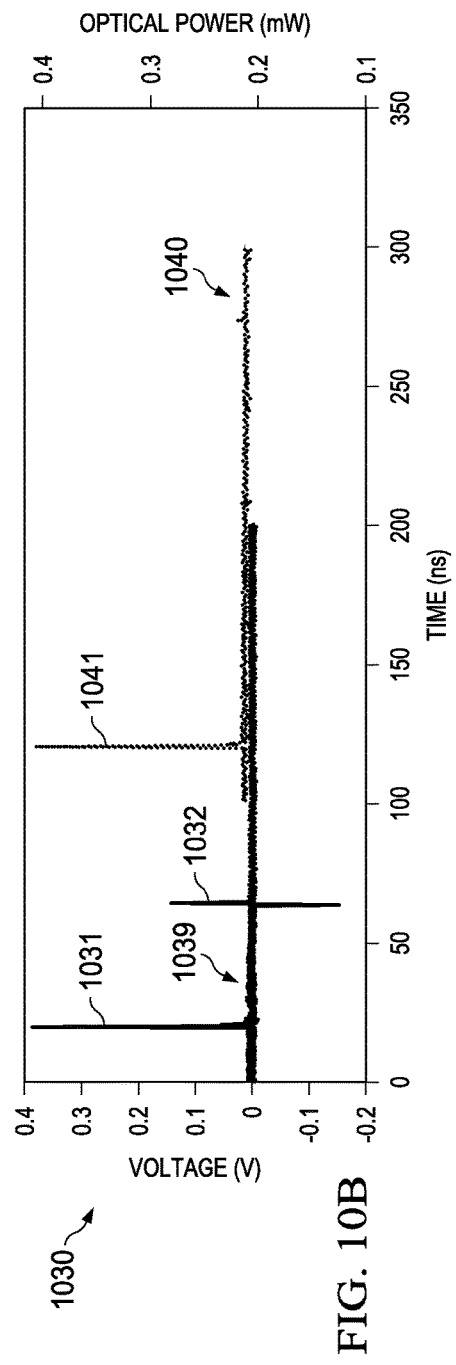
FIG. 10A
FIG. 10B

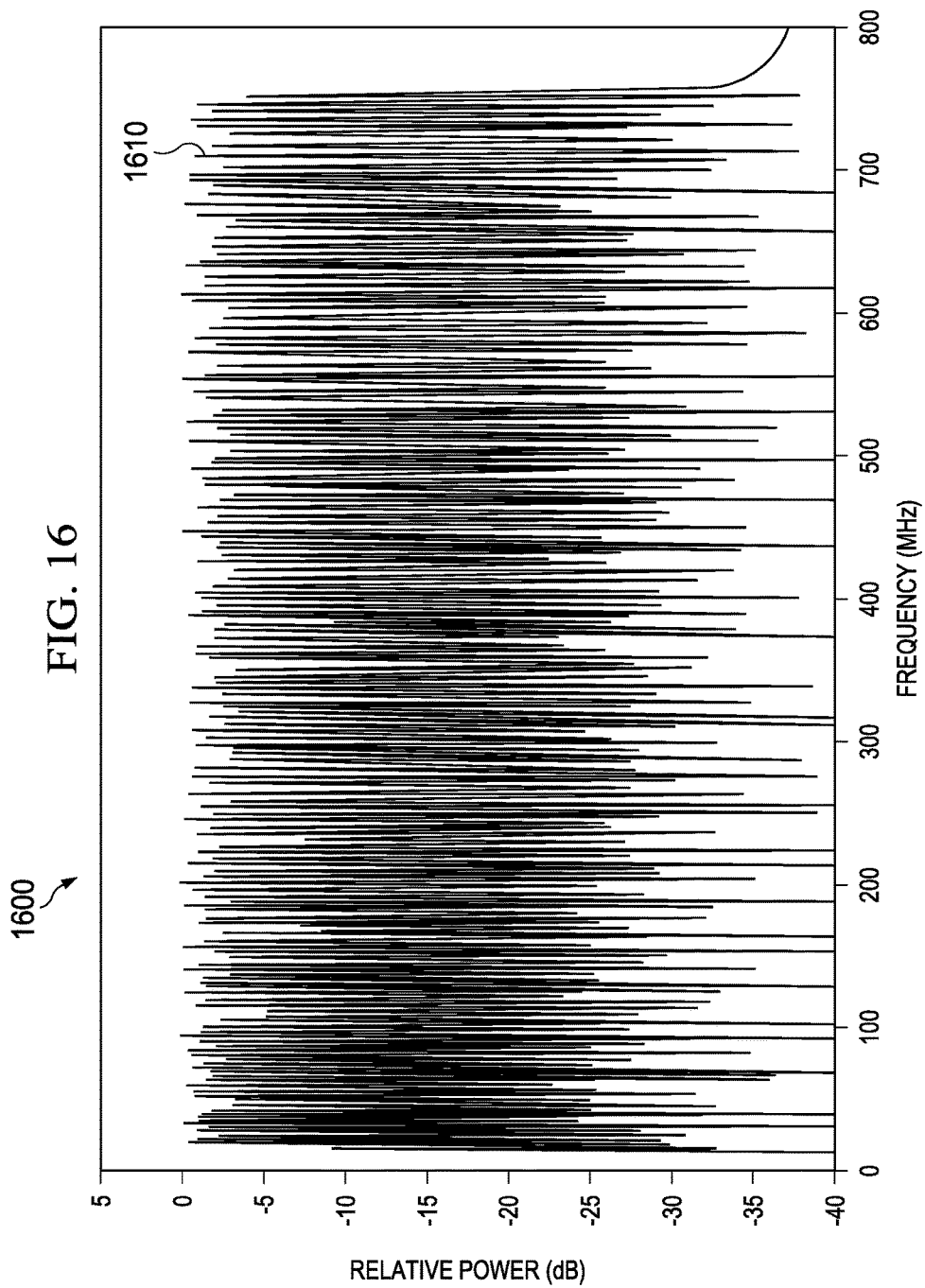

RE-MODULATION CROSSTALK AND INTENSITY NOISE CANCELLATION IN WAVELENGTH-DIVISION MULTIPLEXING (WDM) PASSIVE OPTICAL NETWORKS (PONS)

CROSS-REFERENCE TO RELATED APPLICATIONS

The present application claims priority to U.S. Provisional Patent Application 62/062,658, filed Oct. 10, 2014 by Ning Cheng, and entitled "Re-Modulation Crosstalk and Intensity Noise Cancellation in Wavelength-Division Multiplexing (WDM) Passive Optical Networks (PONs)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is a system for providing network access over the last mile, which is the final portion of a telecommunications network that delivers communication to customers. A PON is a point-to-multipoint (P2MP) network that comprises an optical line terminal (OLT) at a central office (CO), an optical distribution network (ODN), and optical network units (ONUs) at customer premises. PONs may also comprise remote nodes (RNs) located between the OLTs and the ONUs, for instance at the end of a road where multiple customers reside.

In recent years, time-division multiplexing (TDM) PONs such as gigabit-capable PONs (GPONs) and Ethernet PONs (EPONs) have been deployed worldwide for multimedia applications. In TDM PONs, the total capacity is shared among multiple users using a time-division multiple access (TDMA) scheme, so the average bandwidth for each user may be limited to below 100 megabits per second (Mb/s).

Wavelength-division multiplexing (WDM) PONs are considered a promising solution for future broadband access services. WDM PONs may provide high-speed links with dedicated bandwidth up to about 10 gigabits per second (Gb/s). By employing a wavelength-division multiple access (WDMA) scheme, each ONU in a WDM PON is served by a dedicated wavelength channel to communicate with the CO or the OLT.

Next-generation PONs (NG-PONs) and NG-PONs stage 2 (NG-PON2s) may include point-to-point WDM PONs (P2P-WDM PONs) and time- and wavelength-division multiplexing (TWDM) PONs, which may provide data rates higher than 10 Gb/s. TWDM PONs combine TDMA and WDMA to support higher capacity so that an increased number of users may be served by a single OLT with sufficient bandwidth per user. In a TWDM PON, a WDM PON may be overlaid on top of a TDM PON. In other words, different wavelengths may be multiplexed together to share a single feeder fiber, and each wavelength may be shared by multiple users using TDMA.

SUMMARY

In one embodiment, the disclosure includes an apparatus comprising a signal generator configured to produce a modulation signal, a filter coupled to the signal generator and configured to filter the modulation signal to produce a cancellation signal, and a reflective semiconductor optical amplifier (RSOA) coupled to the signal generator and the filter, wherein the RSOA is configured to generate an optical signal according to a difference between the modulation signal and the cancellation signal and transmit the optical signal towards a partial reflection mirror (PRM).

In another embodiment, the disclosure includes a method comprising generating, via a signal generator, an electrical modulation signal, generating, via a filter, a cancellation signal according to the electrical modulation signal, subtracting the cancellation signal from the electrical modulation signal to produce a pre-compensated signal, and modulating a self-seeded reflective semiconductor optical amplifier (SS-RSOA) according to the pre-compensated signal to produce an optical signal, wherein the filter comprises a filter response associated with a round-trip delay between the SS-RSOA and a power reflection coefficient of a partial reflection mirror (PRM).

In yet another embodiment, the disclosure includes an apparatus comprising an optical port configured to receive an optical signal modulated by an electrical signal comprising information data and a reflective crosstalk signal associated with an SS-RSOA, a filter coupled to the optical port and configured to filter the electrical signal to produce a cancellation signal for the reflective crosstalk signal, and a data recovery unit coupled to the optical port and the filter, wherein the data recovery unit is configured to recover the information data in the electrical signal according to a difference between the electrical signal and the cancellation signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2A is a graph illustrating a pulse response of an SS-RSOA in response to a single positive electrical modulation pulse.

FIG. 2B is another graph illustrating a pulse response of an SS-RSOA in response to a single positive electrical modulation pulse.

FIG. 2C is a graph illustrating a pulse response of an SS-RSOA in response to a single negative electrical modulation pulse.

FIG. 2D is another graph illustrating a pulse response of an SS-RSOA in response to a single negative electrical modulation pulse.

FIG. 10A is a graph illustrating a pulse response of an SS-RSOA with FDM-based feedforward pre-cancellation according to an embodiment of the disclosure.

FIG. 10B is a graph illustrating a pulse response of an SS-RSOA with FDM-based feedforward pre-cancellation according to another embodiment of the disclosure.

FIG. 16 is a graph illustrating a radio frequency (RF) spectrum of an aggregated long-term evolution (LTE) signal captured from the experimental set up of FIG. 15 according to an embodiment of the disclosure.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

WDM PONs are a promising solution for broadband services. WDM PONs are capable of providing dedicated bandwidth of about 1 Gb/s to about 10 Gb/s with guaranteed quality of service to subscriber users. Thus, WDM PONs are attractive for business applications, mobile fronthauls, and mobile backhauls. WDM PONs may also be overlaid with TDM PONs to provide efficient sharing of bandwidths among users or other PONs to enable service convergence.

Figure 1:
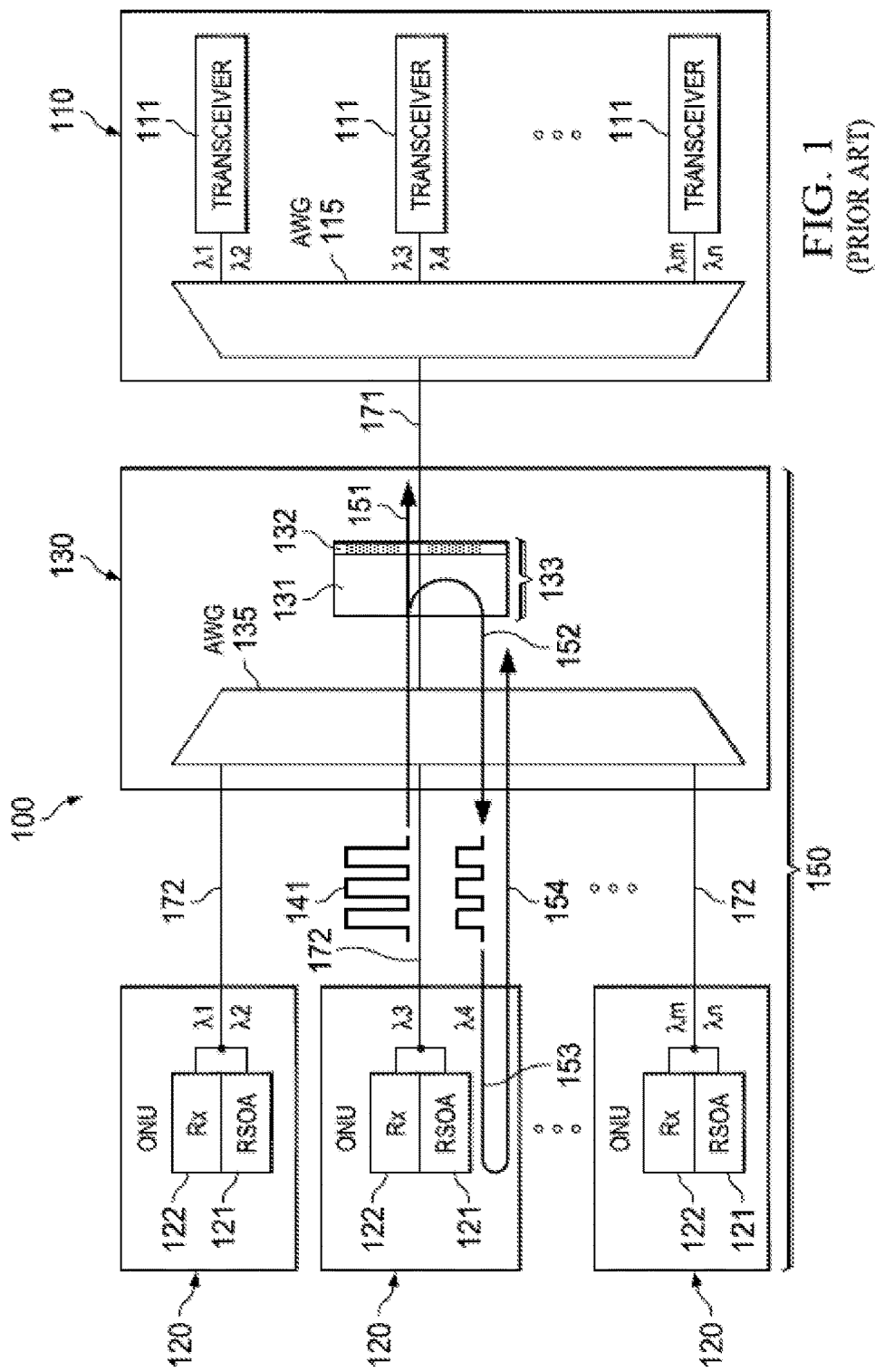
FIG. 1 is a schematic diagram of a self-seeded WDM PON.

FIG. 1 is a schematic diagram of a self-seeded WDM PON 100. The PON 100 is suitable for implementing the disclosed embodiments. The PON 100 is a communications network that does not require any active components to distribute data between an OLT 110 and a plurality of ONUs 120. Instead, the PON 100 uses passive optical components to distribute data between the OLT 110 and the ONUs 120. The PON 100 may adhere to any standard related to multiple-wavelength PONs. The PON 100 comprises the OLT 110, the plurality of ONUs 120, and a remote node (RN) 130 that couples the OLT 110 to the ONUs 120 via a feeder fiber 171 and a plurality of distribution fibers or drop fibers 172. The feeder fiber 171 and the drop fibers 172 are optical fibers, such as standard single-mode fibers (SSMFs). As shown, the feeder fiber 171 extends from the OLT 110 to the RN 130, and the RN 130 is connected to each ONU 120 via one of the drop fibers 172. The OLT 110 is located at a central office, the ONUs 120 are located at distributed locations, such as customer premises, and the RN 130 is commonly located closer to the ONUs 120 than the OLT 110.

The OLT 110 is any device configured to communicate with the ONUs 120 and a backbone network. For example, the backbone network may connect the PON 100 to the Internet. Specifically, the OLT 110 acts as an intermediary between the backbone network and the ONUs 120. For instance, the OLT 110 forwards data received from the backbone network to the ONUs 120 and forwards data received from the ONUs 120 to the backbone network. When the backbone network uses a network protocol that differs from the PON protocol used in the PON 100, the OLT 110 comprises a converter (not shown) that converts the backbone network protocol to the PON protocol. The OLT 110 converter also converts the PON protocol into the backbone network protocol.

The OLT 110 comprises a plurality of transceivers 111 coupled to an arrayed waveguide grating (AWG) 115. The transceivers 111 may comprise tunable lasers or other devices suitable for converting electrical signals into optical signals and transmitting the optical signals on separate downstream wavelength channels to the AWG 115. The transceivers 111 may further comprise photodiodes or other devices suitable for receiving optical signals from a plurality of upstream wavelength channels and converting the received optical signals into electrical signals. Downstream refers to the transmission direction from the OLT 110 to the ONUs 120, whereas upstream refers to the transmission direction from the ONUs 120 to the OLT. Each transceiver 111 employs a pair of wavelength channels, shown as λ1 to λn, to communicate with each ONU 120.

The AWG 115 is a wavelength separator/combiner. In a downstream direction, the AWG 115 combines the various wavelength signals from the transceivers 111 into a single optical signal and feeds the optical signal into the RN 130 via the feeder fiber 171. In an upstream direction, the AWG 115 receives an optical signal from the RN 130 via the feeder fiber 171, separates the received optical signal into multiple optical signals with different wavelengths, and forwards the multiple optical signals to the transceivers 111 via the feeder fiber 171.

The ONUs 120 are any devices configured to communicate with the OLT 110 and a customer or user (not shown). Specifically, the ONUs 120 act as intermediaries between the OLT 110 and the customer. For instance, the ONUs 120 forward data received from the OLT 110 to the customer and forward data received from the customer to the OLT 110 via the RNs 130. The ONUs 120 comprise RSOAs 121 and receivers (Rx) 122. The RSOAs 121 are optical devices configured to modulate and amplify optical signals for transmission to the OLT 110. The receivers 122 may comprise wavelength tunable filters configured to receive optical signals from the OLTs 110.

The RN 130 comprises an AWG 135 similar to the AWG 115, a Faraday rotator (FR) 131, and a partial reflection mirror (PRM) 132. The FR 131 is inserted between the AWG 135 and the PRM 132. In a downstream direction, the AWG 135 receives an optical signal from the OLT 110 via the feeder fiber 171, separates the received optical signal into multiple optical signals with different wavelengths, and forwards the multiple optical signals to the ONUs 120 via the drop fibers 172. In an upstream direction, the AWG 135 combines the various wavelength signals received from the RSOAs 121 of the ONUs 120 via the drop fibers 172 into a single optical signal and feeds the optical signal into the feed fiber 171.

The PRM 132 is a device comprising a partially transmitting coating on a first surface and an antireflection coating on a second surface. Specifically, the PRM 132 is positioned such that the first surface is coupled to the AWG 135 to form a self-seeding cavity 150 with the back facets of the RSOAs 121. Thus, light signals propagate back and forth inside the self-seeding cavity 150. Inside the self-seeding cavity 150, the RSOAs 121 operate as a gain medium, and the AWG 135 operates as a wavelength-selecting element so that output signals of the RSOAs 121 are automatically aligned with the correct wavelength channels. The FR 131 is an optical device that rotates the polarization state of light traveling through it. Specifically, the output polarization state is rotated by about 45 degree(°) with respect to the input polarization state. In the self-seeding cavity 150, the FR 131 stabilizes the polarization state of the signals reflected from the PRM 132. The combination of the FR 131 and the PRM 132 is referred to as a Faraday rotator mirror (FRM) 133.

An optical signal 141 output from an RSOA 121 is filtered by the AWG 135, then partially transmitted to the OLT 110 as shown by the arrow 151 and partially reflected back to the RSOA 121 by the PRM 132 as shown by the arrow 152. After a round-trip delay inside the self-seeding cavity 150, the reflected signal enters the RSOA 121 as shown by the arrow 153, is re-amplified and re-modulated by the RSOA 121, and is transmitted towards the AWG 135 as shown by the arrow 154. Round-trip delay refers to the time duration for the optical signal 141 to propagate from the RSOA 121 to the PRM 132 and the reflected signal to propagate from the PRM 132 to the RSOA 121. The re-amplified and re-modulated optical signal carries both previous data and new data. Thus, the re-amplified and re-modulated optical signal creates reflective crosstalk, which is also called re-modulation crosstalk. The reflective crosstalk acts as noise in the PON 100 and thus degrades system performance. Since the RSOA 121 is seeded by a reflected signal, which is a previous output signal of the RSOA 121, the RSOA 121 is also referred to as an SS-RSOA.

Various approaches have attempted to mitigate re-modulation crosstalk. For instance, Fei Xiong, et al., "Characterization of Directly Modulated Self-Seeded Reflective Semiconductor Optical Amplifiers Utilized as Colorless Transmitters in WDM-PONs," Journal of Lightwave Technology, vol. 31, issue 11, Apr. 12, 2013, which is incorporated by reference, discusses operating the SS-RSOA in the saturation region and modulating with a low extinction ratio (ER). ER reduction alleviates re-modulation crosstalk, but compromises the receiver sensitivity. Tin Komljenovic, et al., "47-km 1.25-Gb/s transmission using a self-seeded transmitter with a modulation averaging reflector," Optics Express, vol. 20, no. 16, Jul. 16, 2012, which is incorporated by reference, discusses modulation averaging. Modulation averaging requires additional components, for instance multiple reflective mirrors, at the remote site. M. L. Deng, et al., "Self-seeding-based 10 Gb/s over 25 km optical OFDM transmissions utilizing face-to-face dual-RSOAs at gain saturation," Optics Express, May 9, 2014, which is incorporated by reference, discusses using dual RSOAs. Dual RSOAs, one biased with a fixed current and the other under direct modulation, increase cost and complexity.

FIGS. 2A-D illustrate the effect of reflective crosstalk for an SS-RSOA such as the RSOAs 121. To determine the effect of the reflective crosstalk, the SS-RSOA is configured in a similar configuration as the self-seeding cavity 150. In the experiment set up, the SS-RSOA is coupled to an AWG such as the AWG 135, which is coupled to an FR such as the FR 131. The FR is coupled to a PRM such as the PRM 132, where the PRM comprises a reflectivity of 80 percent (%). In the experimental set up, the SS-RSOA is directly modulated by an electrical driving signal comprising periodical pulses with about a 200 picoseconds (ps) pulse duration and about a 300 kilohertz (kHz) repetition rate. The electrical driving signal is also referred to as an electrical modulation signal. The low pulse repetition rate is chosen so that the reflective crosstalk between the modulated pulses may be clearly observed. To reduce the effect of optical intensity noise, the output from the SS-RSOA is measured repeatedly and averaged over one hundred and twenty-eight waveforms. The measurement results for the response of the SS-RSOA are shown in FIGS. 2A-D. In FIGS. 2A-D, the x-axis represents time in units of nanoseconds (ns), the left y-axis represents voltages in units of volts (V), and the right y-axis represents optical power in units of milliwatts (mW).

FIG. 2A is a graph 210 illustrating a pulse response 220 of the SS-RSOA in response to a single positive electrical modulation pulse 211. In the graph 210, the electrical modulation signal comprising the electrical modulation pulse 211 is shown as a solid curve, and the pulse response 220 is shown as a dotted curve. The pulse response 220 is measured when the SS-RSOA is under a bias current of about 25 milliamps (mA). In the pulse response 220, the first pulse 221 is the output signal of the electrical modulation pulse 211 under direct modulation, and subsequent pulses 222, 223, 224, and 225 are the results of reflective crosstalk in the self-seeding cavity. As shown, the optical power of the reflected pulses 222-225 decrease as time increases. The sub-plot 229 shows an expanded view of the first reflected pulse 222 in a time unit scale of about 1 nanosecond (ns).

FIG. 2B is another graph 230 illustrating a pulse response 240 of the SS-RSOA in response to a single positive electrical modulation pulse 231. In the graph 230, the electrical modulation signal comprising the electrical modulation pulse 231 is shown as a solid curve, and the pulse response 240 is shown as a dotted curve. The electrical modulation pulse 231 is similar to the electrical modulation pulse 211. However, the pulse response 240 is measured when the RSOA is under a bias current of about 50 mA instead of 25 mA. Similar to the pulse response 220, the first pulse 241 in the pulse response 240 is the output signal of the electrical modulation pulse 231 under direct modulation, and subsequent pulses 242 and 243 are the results of reflective crosstalk in the self-seeding cavity. As shown, the first reflected pulse 242 comprises a substantial amount of optical power, but the optical power of the reflected pulse 243 is substantially decreased compared to the first reflected pulse 242. The sub-plot 249 shows an expanded view of the first reflected pulse 242 in a time unit scale of about 1 ns.

FIG. 2C is a graph 250 illustrating a pulse response 260 of the SS-RSOA in response to a single negative electrical modulation pulse 251. In the graph 250, the electrical modulation signal comprising the electrical modulation pulse 251 is shown as a solid curve, and the pulse response 260 is shown as a dotted curve. The pulse response 260 is measured when the RSOA is under a bias current of about 50 mA. The first pulse 261 in the pulse response 260 is the output signal of the electrical modulation pulse 251 under direct modulation and subsequent pulses 262, 263, and 264 are the results of reflective crosstalk in the self-seeding cavity. As shown, the optical power of the reflected pulses 262-264 decrease as time increases. The sub-plot 269 shows an expanded view of the first reflected pulse 262 in a time unit scale of about 1 ns.

FIG. 2D is a graph 270 illustrating another pulse response 280 of the SS-RSOA in response to a single negative electrical modulation pulse 271. In the graph 270, the electrical modulation signal comprising the electrical modulation pulse 271 is shown as a solid curve, and the pulse response 280 is shown as a dotted curve. The electrical modulation pulse 271 is similar to the electrical modulation pulse 251. However, the pulse response 280 is measured when the RSOA is under a bias current of about 75 mA. Similar to the pulse response 220, the first pulse 281 in the pulse response 280 is the output signal of the electrical modulation pulse 271 under direct modulation and subsequent pulses 282 and 283 are the results of reflective crosstalk in the self-seeding cavity. As shown, the first reflected pulse 282 comprises a substantial amount of optical power, but the optical power of the subsequent reflected pulse 283 is substantially decreased compared to the first reflected pulse 282. The sub-plot 289 shows an expanded view of the first reflected pulse 282 in a time unit scale of about 1 ns.

In FIGS. 2A-2D, the elapsed time between any two of the pulses 221-225, 241-243, 261-264, and 281-282 is the round-trip time in the self-seeding cavity formed by the back-facet mirror of the RSOA and the PRM. It should be noted that the gain of the RSOA gain remains almost constant with varying bias current since the RSOA gain is clamped due to the optical feedback inside the self-seeded cavity. However, under a higher bias current, the RSOA operates in a deeper saturation mode. Comparing the pulse response 220 to the pulse response 240 and the pulse response 260 to the pulse response 280, the effect of reflective crosstalk reduces with a higher bias current, but remains significant. Under continuous modulation, such reflective crosstalk distorts the transmitted signal and degrades the transmission performance. In addition, the reflective crosstalk increases with lower cavity loss or higher reflectivity from the PRM. With lower mirror reflectivity, the signal-to-crosstalk ratio may be improved, but at the same time the relative intensity noise of the transmitted signal increases. Further, the RSOA may generate ASE noise, which also degrades the transmission performance. There is therefore a desire to reduce both re-modulation crosstalk and ASE noise.

Disclosed herein are embodiments for reducing both reflective crosstalk and ASE noise for SS-RSOAs in WDM PONs. The disclosed embodiments employ a feedforward cancellation filter at an ONU transmitter employing an SS-RSOA to pre-cancel or pre-compensate the reflective crosstalk prior to transmission to an OLT. The feedforward cancellation filter filters an electrical modulation signal to produce a cancellation signal for the reflective crosstalk. The SS-RSOA is modulated by a difference between the electrical modulation signal and the cancellation signal. In an embodiment, the feedforward cancellation filter is predetermined by measuring a pulse response at the output of the SS-RSOA. The pulse response corresponds to the optical-to-optical response of the SS-RSOA. In another embodiment, the feedforward cancellation filter is adapted based on a feedback signal. The feedback signal is received by coupling a photodetector to the output of the SS-RSOA. Thus, the feedback signal comprises a portion of the SS-RSOA output signal and a portion of the reflected signal from the PRM. The reflective crosstalk cancellation at the ONU transmitter is referred to as pre-cancellation or pre-compensation. To further improve performance, the disclosed embodiments employ another feedforward cancellation filter at the OLT receiver to cancel residual reflective crosstalk, which may result from imperfection or inaccuracies of the ONU transmitter's feedforward cancellation filter. The cancellation of the residual reflective crosstalk at the ONU receiver is referred to as post-cancellation or post-compensation. In addition to reflective crosstalk, ASE noise produced by the SS-RSOA may also degrade performance. In another embodiment, the disclosed embodiments employ a feedback filter at the ONU transmitter to pre-cancel both the reflective crosstalk and the ASE noise. The disclosed feedforward pre-cancellation, adaptive pre-cancellation, and feedforward post-cancellation mechanisms effectively reduce reflective crosstalk and improve performance under high extinction ratios (ERs). The disclosed embodiments are suitable for any SS-RSOA-based transmitters and corresponding receivers. For example, the disclosed embodiments may be applied to wireless fronthauls to provide a low cost solution for wireless fronthauls.

Figure 3:
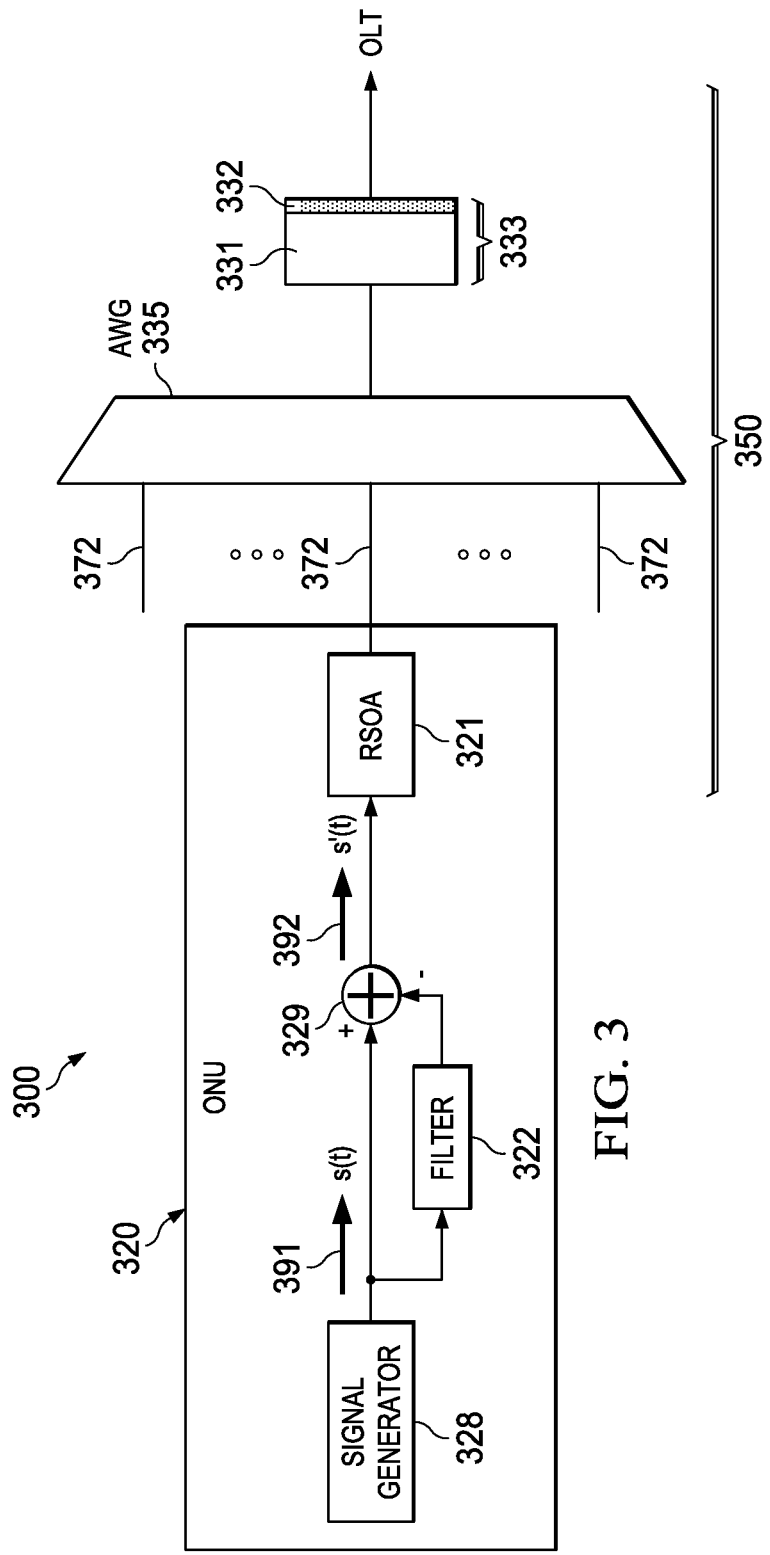
FIG. 3 is a schematic diagram of a feedforward reflective crosstalk pre-cancellation scheme according to an embodiment of the disclosure.

FIG. 3 is a schematic diagram of a feedforward reflective crosstalk pre-cancellation scheme 300 according to an embodiment of the disclosure. The scheme 300 is employed by an SS-RSOA-based ONU 320 similar to the ONUs 120 in a WDM PON such as the WDM PON 100 to cancel reflective crosstalk in a self-seeding cavity 350 similar to the self-seeding cavity 150. The ONU 320 comprises a signal generator 328 coupled to an RSOA 321 similar to the RSOA 121. The signal generator 328 is a device configured to generate an electrical modulation signal 391 that directly modulates the RSOA 321. The signal generator 328 may comprise analog components, digital components and digital processing units. The self-seeding cavity 350 is formed from the RSOA 321, an AWG 335 similar to the AWG 135, and an FRM 333 similar to the FRM 133. The FRM 333 comprises an FR 331 similar to the FR 131 and a PRM 332 similar to the PRM 132. The AWG 335 and the FRM 333 may be located in an RN similar to the RNs 130 or another suitable location. The AWG 335 may be further coupled to a plurality of ONUs (not shown) in a similar configuration as the WDM PON 100. The reflective crosstalk may comprise a pulse response similar to the pulse responses 220, 240, 260, and 280.

In the scheme 300, the electrical modulation signal 391 is applied to the RSOA 321 for optical modulation and transmission. The electrical modulation signal 391 is represented as s(t) in the time domain. For example, the electrical modulation signal 391 may carry non-return-to-zero (NRZ) data. Assuming the RSOA 321 comprises a linear response, the output of the RSOA 321 is expressed as shown below:

$$P(\omega)=H_{EO}(\omega)S(\omega), \qquad (1)$$

where $P(\omega)$ is the output signal spectrum of the RSOA 321, $H_{EO}(\omega)$ is the electrical-to-optical response of the RSOA 321, and $S(\omega)$ is the spectrum of s(t).

The RSOA 321 output signal propagates through a drop fiber 372 similar to the drop fiber 172 and the feeder fiber 171, passes through the AWG 335 and the FR 331, and is reflected by the PRM 332. The reflected signal propagates in a reverse direction, passing through the FR 331, the AWG 335, and the drop fiber 372, and then arrives at the RSOA 321, which re-amplifies the reflected signal. The re-amplified and reflected signal is represented as shown below:

$$P_r(\omega)=RH_f^2(\omega)H_{AWG}^2(\omega)H_o(\omega)\exp(-j\omega\tau)P(\omega), \qquad (2)$$

where R is the power reflection coefficient of the PRM 332, $H_f^2(\omega)$ is the power-frequency response of the drop fiber 372, $H_{AWG}^2(\omega)$ is the power-frequency response of the AWG 335, $H_o(\omega)$ is the optical-to-optical response of the RSOA 321, and $\exp(-j\omega\tau)$ is the frequency response of the round-trip delay, denoted as $\tau$, in the self-seeding cavity 350.

As shown in Equation (2), the propagation delay along the drop fiber 372, the AWG 335, and the FR 331 are separated from the frequency responses, $H_f(\omega)$ and $H_{AWG}(\omega)$, and expressed as a separate term $\exp(-j\omega\tau)$. Equation (2) may be simplified by disregarding the nonlinearity and the dispersion of the drop fiber 372 and assuming that the signal spectrum of the AWG 335 is flat in the passband. Thus, the cavity loss of the self-seeding cavity 350 may be represented as a constant as shown below:

$$k=H_f^2(\omega)H_{AWG}^2(\omega). \qquad (3)$$

Substituting Equations (1) and (3) into Equation (2), the reflected and re-amplified signal, which is the reflective crosstalk, is expressed as shown below:

$$P_r(\omega)=kR\exp(-j\omega\tau)H_o(\omega)H_{EO}(\omega)S(\omega) \qquad (4)$$

Since the reflective crosstalk is generated from the transmitted signal reflected from the PRM 332 and then re-amplified by the RSOA 321, the scheme 300 employs a feedforward approach to pre-cancel the reflective crosstalk prior to transmission. As shown, the ONU 320 further comprises a feedforward crosstalk cancellation filter 322 positioned between the signal generator 328 and a signal addition/subtraction unit 329 in a feedforward path. In order to cancel the reflective crosstalk shown in Equation (4), the filter 322 is configured to produce an estimate of the reflective crosstalk so that the reflective crosstalk estimate may be subtracted from the electrical modulation signal 391 prior to modulating the RSOA 321. To generate a reflective crosstalk estimate based on Equation (4), the filter 322 is configured with a frequency response as shown below:

$$H(\omega)=kRH_o(\omega)\exp(-j\omega\tau). \qquad (5)$$

To cancel the reflective crosstalk, the electrical modulation signal 391 is filtered by the filter 322 to produce a reflective crosstalk estimate, which is also referred to as a cancellation signal. The signal addition/subtraction unit 329 subtracts the reflective crosstalk estimate from the electrical modulation signal 391 to produce a crosstalk pre-compensated signal 392, shown as s'(t). The crosstalk pre-compensated signal s'(t) 392 is then applied to the RSOA 321. Thus, the frequency response of the crosstalk pre-compensated signal 392, s'(t), is expressed as shown below:

$$S'(\omega)=[1-kRH_o(\omega)\exp(-j\omega\tau)]S(\omega). \qquad (6)$$

When the crosstalk pre-compensated signal 392, s'(t), is applied to the RSOA 321, the RSOA 321 produces an output as shown below:

$$P'(\omega)=H_{EO}(\omega)S(\omega)-kR\exp(-j\omega\tau)H_o(\omega)H_{EO}(\omega)S(\omega). \qquad (7)$$

The second term, $kR\exp(-j\omega\tau)H_o(\omega)H_{EO}(\omega)S(\omega)$, of Equation (7) is the estimated reflective crosstalk corresponding to the reflected crosstalk, $P_r(\omega)$, shown in Equation (2). Thus, substituting the second term cancels the reflected crosstalk, $P_r(\omega)$. The second term of Equation (7) corresponds to only a first reflected and re-amplified pulse, such as the pulse 222, 242, 262, and 282. Once the first reflected and re-amplified pulse is cancelled, the subsequent reflected and re-amplified crosstalk pattern, which is generated from multiple reflections inside the self-seeding cavity 350, is also eliminated.

As shown in Equations (3) and (5), the filter 322 response, $H(\omega)$, is formed from $H_f(\omega)$, $H_{AWG}(\omega)$, and $H_o(\omega)$, where $H_f(\omega)$ and $H_{AWG}(\omega)$ are fixed for a certain WDM PON configuration and $H_o(\omega)$ may be predetermined. To determine the optical-to-optical response, $H_o(\omega)$, an electrical pulse may be applied to the RSOA 321 and the reflected signal pulse response from the PRM 332 may be measured at the RSOA 321 output. In an embodiment, the reflected signal pulse response may be measured off-line prior to deploying the ONU 320 in the WDM PON and the filter 322 is a predetermined filter. The filter 322 may be an analog filter constructed from analog components such as resistors and capacitors or a digital filter such as a 3-tap finite impulse response (FIR) filter employing a processing unit such as a digital signal processor (DSP).

Figure 4:
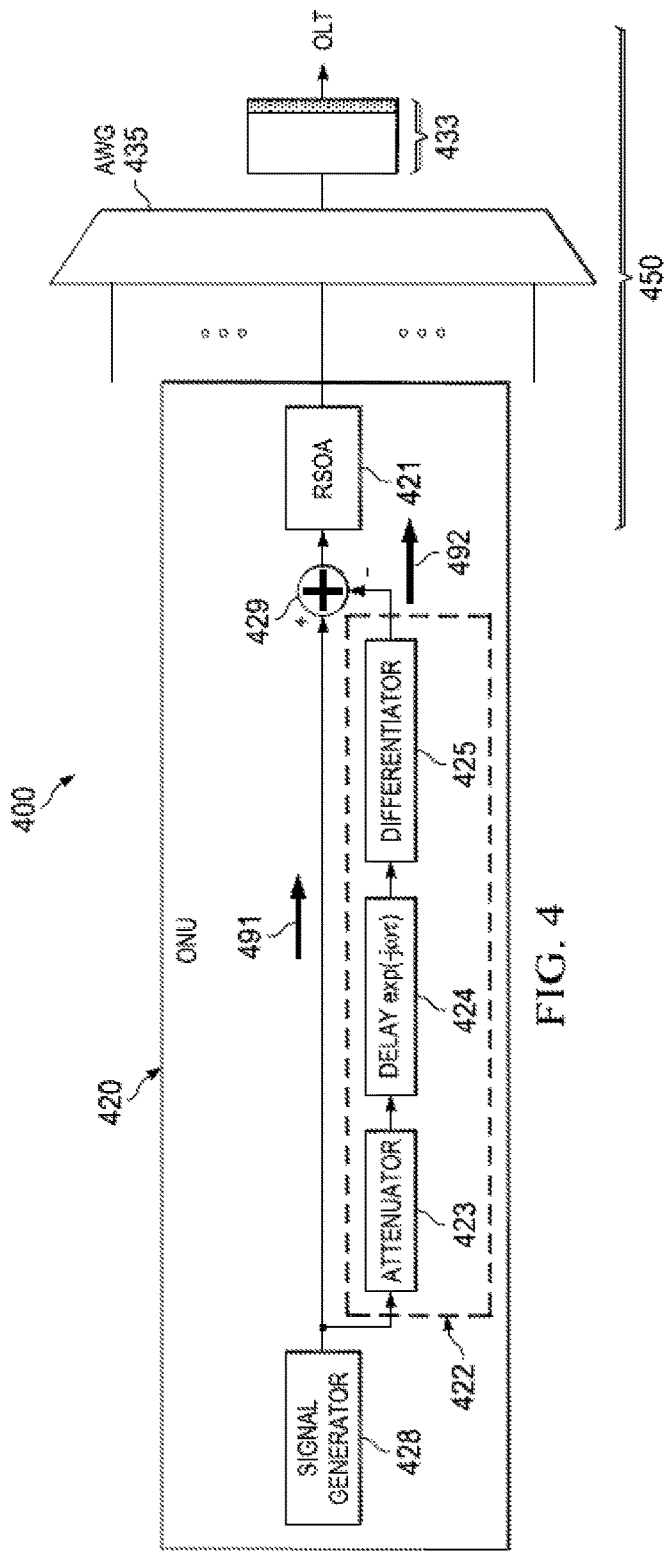
FIG. 4 is a schematic diagram of a feedforward reflective crosstalk pre-cancellation scheme implementing a feedforward differentiation method (FDM) according to an embodiment of the disclosure.

FIG. 4 is a schematic diagram of a feedforward reflective crosstalk pre-cancellation scheme 400 that implements an FDM according to an embodiment of the disclosure. The scheme 400 is employed by an SS-RSOA-based ONU 420 similar to the ONUs 120 and 320 in a WDM PON such as the WDM PON 100 to cancel reflective crosstalk in a self-seeding cavity 450 similar to the self-seeding cavities 150 and 350. The ONU 420 comprises a signal generator 428 similar to the signal generator 328 coupled to an RSOA 421 similar to the RSOAs 121 and 321. The self-seeding cavity 450 is formed from the RSOA 421, an AWG 435 similar to the AWGs 135 and 335, and an FRM 433 similar to the FRMs 133 and 333. The AWG 435 may be further coupled to a plurality of ONUs (not shown) in a similar configuration as shown in the WDM PON 100, where the plurality of ONUs may or may not be SS-RSOA-based ONUs. The reflective crosstalk may comprise a pulse response similar to the pulse responses 220, 240, 260, and 280. The scheme 400 employs a feedforward approach similar to the scheme 300. However, the scheme 400 considers the nonlinear effect of the RSOA 421, where the ONU 420 employs a feedforward crosstalk cancellation filter 422 that approximates the RSOA 421 response including the nonlinear effect.

By observing the sub-plots 229, 249, 269, and 289, the reflected pulses 222, 242, 262, and 282 resemble differentiations or gradients of the signal pulses 211, 231, 251, and 271, respectively. The differentiation effect is caused by the RSOA 421 operating in a saturation regime. As the reflected pulse is re-amplified by the RSOA 421 under a fixed bias current, the carrier density in the active region of the RSOA 421 is partially depleted. Then, immediately following the re-amplified pulse, there is an opposite pulse due to carrier depletion and subsequent carrier recovery. To incorporate and approximate the differentiation effect, the filter 422 is constructed from an attenuator 423, a delay unit 424, shown as $\exp(-j\omega\tau)$, and a differentiator 425. Thus, the filter 422 frequency response, $H(\omega)$, is expressed as shown below:

$$H(\omega)=j\omega A\exp(-j\omega\tau), \quad (8)$$

where $j\omega$ represents differentiation in the time domain, $\exp(-j\omega\tau)$ denotes the round-trip delay, $\tau$, inside the self-seeding cavity 450, and A is the attenuation coefficient which may be adjusted according to the bias current. The attenuation coefficient, A, in Equation (8) corresponds to k in Equation (3) and the power reflection coefficient, R, described above. The delay and the differentiation may be predetermined offline by measuring the reflected pulse response at the output of the RSOA 421.

To perform reflective crosstalk pre-cancellation, the filter 422 is positioned between the signal generator 428 and a signal addition/subtraction unit 429 at the ONU 420. The signal generator 428 produces an electrical modulation signal 491 based on a data signal. The electrical modulation signal 491 is filtered by the filter 422 to produce a reflective crosstalk estimate. The signal addition/subtraction unit 429 subtracts the reflective crosstalk estimate from the electrical modulation signal 491 to produce a crosstalk pre-compensated signal 492. The crosstalk pre-compensated signal 492 is applied to the RSOA 421 for optical modulation and transmission. Similar to the filter 322, the filter 422 may be an analog filter or a digital filter and may be predetermined.

Figure 5:
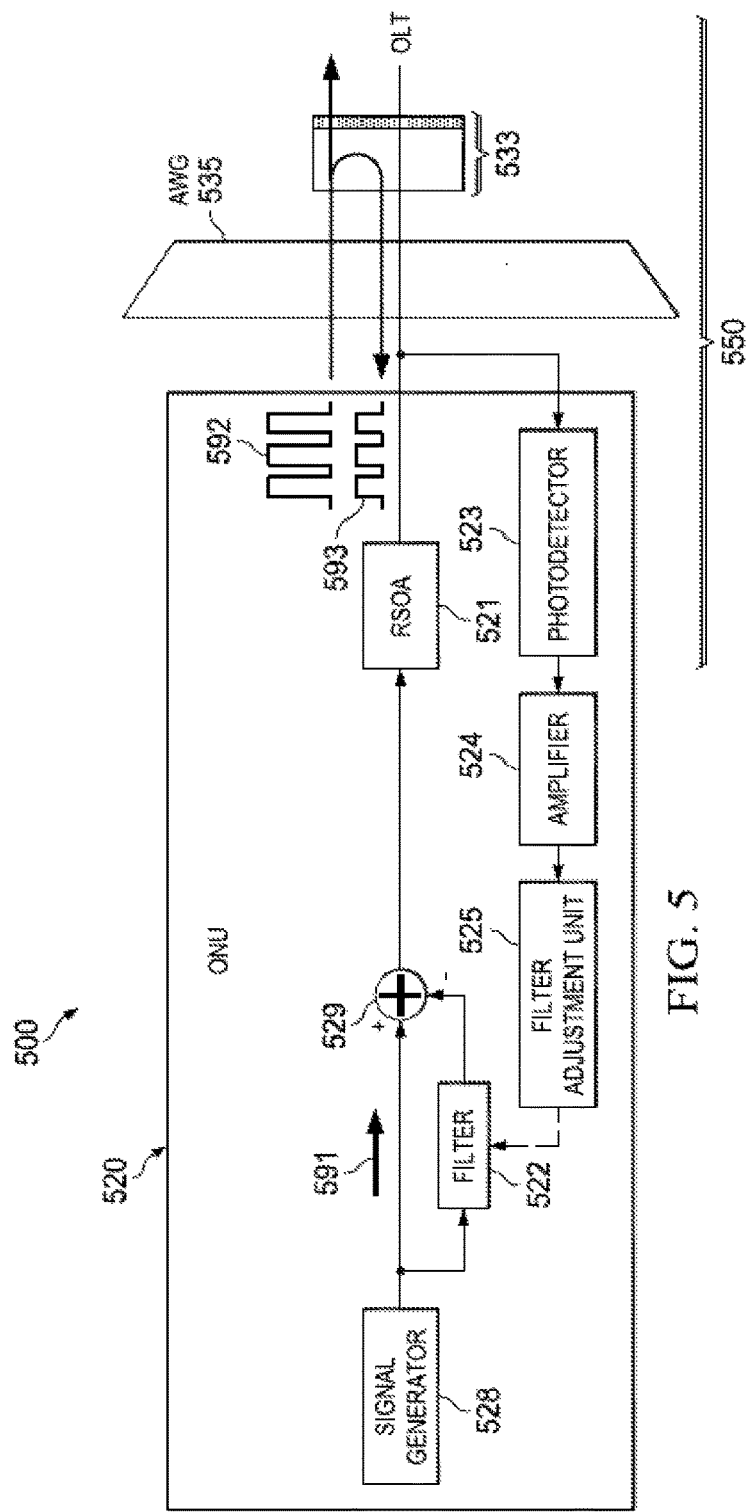
FIG. 5 is a schematic diagram of an adaptive feedback reflective crosstalk pre-cancellation scheme according to an embodiment of the disclosure.

FIG. 5 is a schematic diagram of an adaptive feedback reflective crosstalk pre-cancellation scheme 500 according to an embodiment of the disclosure. The scheme 500 is employed by an SS-RSOA-based ONU 520 similar to the ONUs 120, 320, and 420 in a WDM PON such as the WDM PON 100 to cancel reflective crosstalk in a self-seeding cavity 550 similar to the self-seeding cavities 150, 350, and 450. The ONU 520 comprises a signal generator 528 similar to the signal generators 328 and 428 coupled to an RSOA 521 similar to the RSOAs 121, 321, and 421, which operates based on a seed light source provided by the self-seeding cavity 550. The self-seeding cavity 550 is formed from the RSOA 521, an AWG 535 similar to the AWGs 115, 135, 335, and 435, and an FRM 533 similar to the FRMs 133, 333, and 433. The AWG 535 may be further coupled to a plurality of ONUs (not shown) in a similar configuration as shown in the WDM PON 100, where the plurality of ONUs may or may not be SS-RSOA-based ONUs. The reflective crosstalk may comprise a pulse response similar to the pulse responses 220, 240, 260, and 280. The scheme 500 employs an adaptive feedback approach to determine and cancel the reflective crosstalk prior to transmission.

To implement the adaptive feedback approach, the ONU 520 further comprises a photodetector 523, an amplifier 524, a filter adjustment unit 525, and an adaptive reflective crosstalk cancellation filter 522. The photodetector 523 is an optical device that detects light signal and converts the detected light signal into an analog electrical signal. The photodetector 523 is coupled to the output of the RSOA 521 to receive a feedback signal comprising a combination of the RSOA 521, output signal 592 and a portion of the output signal 592 reflected from the FRM 533, shown as reflected signal 593. The amplifier 524 is an electrical device configured to amplify the received signal. The filter adjustment unit 525 measures the optical-to-optical response of the RSOA 521 from the received signal and configures the filter 522 according to the measured optical-to-optical response of the RSOA 521.

For example, the reflected crosstalk effect may vary with the RSOA 521 bias current, which is time varying. The varying bias current may cause the reflected pulse response to vary similar to the variations shown between the pulse responses 220 and 240 or between the pulse responses 260 and 280. In an embodiment, a known sequence of pulses, which may be referred to as a training sequence, is applied to the RSOA 521 when the ONU 520 is powered on, and the RSOA 521 output is detected including the modulated signal produced by the RSOA 521 and the reflective crosstalk produced by the FRM 533. Then, the response of the RSOA 521 is determined and employed to construct the filter 522. Subsequently, the filter 522 may be adjusted to adapt to changes detected from the RSOA 521 output. In an embodiment, the filter 522 is implemented as an analog filter. For example, the filter 522 is adjusted by switching analog components, such as resistors and capacitors, to include and exclude certain analog components according to the measured RSOA 521 response. In another embodiment, the filter 522 is implemented as a digital filter. For example, a DSP may be configured to estimate the RSOA 521 optical-to-optical response and compute filter taps or coefficients for the filter 522 according to the estimated response.

After the filter 522 is determined or configured, the reflective crosstalk pre-cancellation is similar to the schemes 300 and 400. As shown, the filter 522 is positioned between the signal generator 528 and a signal addition/subtraction unit 529 at the ONU 520. The signal generator 528 produces an electrical modulation signal 591 based on a data signal. The filter 522 filters the electrical modulation signal 591 to produce a reflective crosstalk estimate. The signal addition/subtraction unit 529 subtracts the reflective crosstalk estimate from the electrical modulation signal 591 to produce a crosstalk pre-compensated signal 592. The crosstalk pre-compensated signal 592 is applied to the RSOA 521 for optical modulation and transmission.

Figure 6:
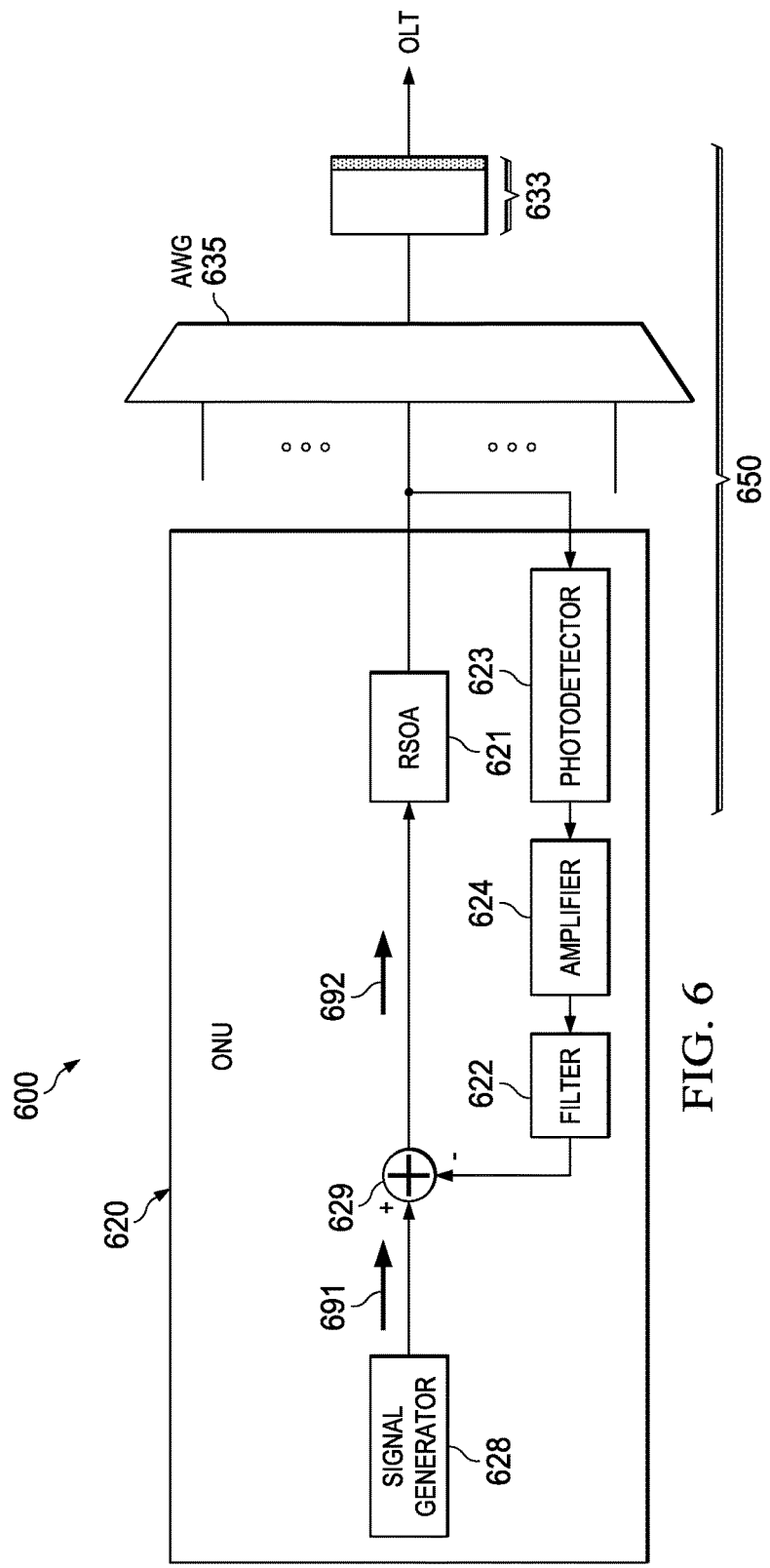
FIG. 6 is a schematic diagram of a feedforward reflective crosstalk and amplified spontaneous emission (ASE) noise pre-cancellation scheme according to an embodiment of the disclosure.

FIG. 6 is a schematic diagram of a feedforward reflective crosstalk and ASE noise pre-cancellation scheme 600 according to an embodiment of the disclosure. The scheme 600 is employed by an SS-RSOA-based ONU 620 similar to the ONUs 120, 320, 420, and 520 to cancel ASE noise and reflective crosstalk in a self-seeding cavity 650 similar to the self-seeding cavities 150, 350, 450, and 550. The ONU 620 comprises a signal generator 628 similar to the signal generators 328, 428, and 528 coupled to an RSOA 621 similar to the RSOAs 121, 321, 421, and 521, which operates based on a seed light source provided by the self-seeding cavity 650. The self-seeding cavity 650 is formed from the RSOA 621, an AWG 635 similar to the AWGs 115, 135, 335, 435, and 535 and an FRM 633 similar to the FRMs 133, 333, 433, and 533. The AWG 635 may be further coupled to a plurality of ONUs (not shown) in a similar configuration as shown in the WDM PON 100, where the plurality of ONUs may or may not be SS-RSOA-based ONUs. The reflective crosstalk may comprise a pulse response similar to the pulse responses 220, 240, 260, and 280. The scheme 600 employs a feedback approach to cancel the ASE noise and the reflective crosstalk effect prior to transmission. The ASE noise is generated by the RSOA 621 and is another impairment that degrades transmission performance.

To implement the ASE and reflective crosstalk pre-cancellation, the ONU 620 further comprises a photodetector 623 similar to the photodetector 523, an amplifier 624 similar to the amplifier 524, a feedback filter 622, and a signal addition/subtraction unit 629. The photodetector 623 is coupled to the output of the RSOA 621 so that the ONU 620 may receive a combination of the RSOA 621 output, which includes the ASE noise and the reflected signal from the FRM 633. The amplifier 624 is coupled to the output of the photodetector 623 and configured to amplify the received signal. The filter 622 is configured with a frequency response as shown below:

$$H(f) = H_e^{-1}(f) H_o(f), \quad (9)$$

where $H_e^{-1}(f)$ is the inverse of the electrical-to-optical response of the RSOA 621, and $H_o(f)$ is the optical-to-optical response of the RSOA 621.

To cancel the reflective crosstalk and the ASE noise, the detected and amplified photocurrent detected by the photodetector 623 is filtered by the filter 622. The filtered signal is an estimate of the ASE and the reflective crosstalk. The signal addition/subtraction unit 629 subtracts the filtered signal from an electrical modulation signal 691 output by the signal generator 628 to produce an ASE and reflective crosstalk pre-compensated signal 692. The pre-compensated signal 692 is then applied to the RSOA 621.

Figure 7:
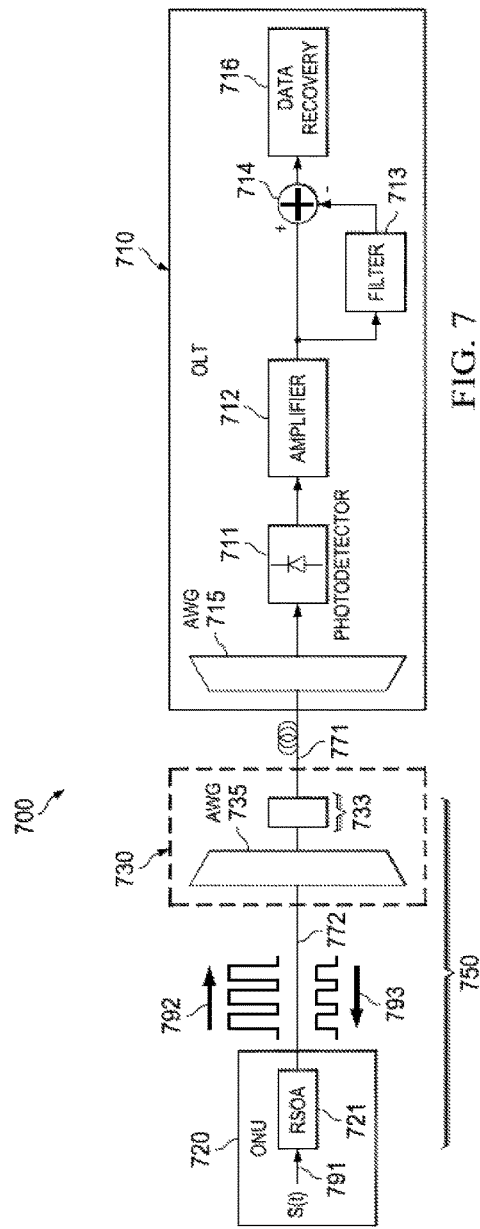
FIG. 7 is a schematic diagram of a reflective crosstalk post-cancellation scheme according to an embodiment of the disclosure.

FIG. 7 is a schematic diagram of a reflective crosstalk post-cancellation scheme 700 according to an embodiment of the disclosure. The scheme 700 is employed by a receiver of an OLT 710 similar to the OLT 110 in a WDM PON such as the WDM PON 100. As shown, the OLT 710 is configured to receive a signal from an SS-RSOA-based ONU 720 similar to the ONUs 120, 320, 420, 520, and 620 comprising an RSOA 721 similar to the RSOAs 121, 321, 421, 521, and 621, where the received signal comprises reflective crosstalk generated from a self-seeding cavity 750 similar to the self-seeding cavities 150, 350, 450, 550, and 650. The self-seeding cavity 750 is formed from the RSOA 721, an AWG 735 similar to the AWGs 115, 135, 335, 435, 535, and 635 and an FRM 733 similar to the FRMs 133, 333, 433, 533, and 633, where the AWG 735 and the FRM 733 are positioned in an RN 730 similar to the RN 130. The AWG 735 may be further coupled to a plurality of ONUs (not shown) in a similar configuration as shown in the WDM PON 100, where the plurality of ONUs may or may not be SS-RSOA-based ONUs. The reflective crosstalk may comprise a pulse response similar to the pulse responses 220, 240, 260, and 280. The scheme 700 performs feedforward reflective crosstalk post-cancellation at a receiver of the OLT 710. In an embodiment, the ONU 720 may also perform reflective crosstalk cancellation by employing a scheme similar to the schemes 300, 400, 500, and 600. Depending on the accuracies of the reflective crosstalk estimation, the ONU 720 may not fully cancel the reflective crosstalk at the ONU 720 transmitter. Thus, the scheme 700 is employed to remove or suppress residual reflective crosstalk.

As an example, at a time t=0, an electrical signal 791, shown as s(t), is modulated by the RSOA 721 to produce an output signal 792, which comprises a frequency response, P(ω), as shown in Equation (1). After a round-trip delay of τ, at a time, t=τ, the reflected signal 793 arrives at the RSOA 721 output. The second copy is expressed as $P_{r1}(\omega)$ shown in Equation (2). As described above, the reflected signal is re-amplified and re-modulated by the RSOA 721. Thus, after another round-trip delay, at a time, t=2τ, a second copy of the reflected and re-amplified signal arrives at the RSOA 721 output, which is expressed as shown below:

$$P_{r2}(\omega) = [kR\exp(-j\omega\tau)H_o(\omega)]^2 H_{EO}(\omega)S(\omega). \quad (10)$$

The reflected and re-amplified signals may continue to propagate back and forth inside the self-seeding cavity 750, thus creating multiple copies of the reflective crosstalk. The total reflective crosstalk is expressed as shown below:

$$P_{r,total}(\omega) = H_{EO}(\omega)S(\omega) \sum_{m=1}^{\infty} [kR\exp(-j\omega\tau)H_o(\omega)]^m \quad (11)$$
$$= H_{EO}(\omega)S(\omega) \frac{kR\exp(-j\omega\tau)H_o(\omega)}{1 - kR\exp(-j\omega\tau)H_o(\omega)}.$$

Therefore, the signal received by the OLT 710 comprises both the original modulated signal 791 shown in Equation (1) and the reflective crosstalk shown in Equation (11). Thus, the electrical signal received by the OLT 710 is expressed as shown below:

$$V_{Rx}(\omega) = H_{EO}(\omega)H_{fiber}(\omega)H_{OE}(\omega)S(\omega) + \quad (12)$$
$$H_{EO}(\omega)H_{fiber}(\omega)H_{OE}(\omega)S(\omega) \frac{kR\exp(-j\omega\tau)H_o(\omega)}{1 - kR\exp(-j\omega\tau)H_o(\omega)} =$$
$$H_{EO}(\omega)H_{fiber}(\omega)H_{OE}(\omega)S(\omega) \frac{1}{1 - kR\exp(-j\omega\tau)H_o(\omega)},$$

where $H_{fiber}(\omega)$ is the feeder fiber 771 response and $H_{OE}(\omega)$ is the optical-to-electrical response of the OLT 710 receiver. Based on Equation (12), the OLT 710's receiver may cancel the reflective crosstalk effect as shown in the last term, $$\frac{1}{1 - kR\exp(-j\omega\tau)H_o(\omega)},$$

of Equation (12) by employing a feedforward filter 713 in a receive path, where the filter 713 response is expressed as shown below:

$$H(\omega) = kRH_o(\omega)\exp(-j\omega\tau). \quad (13)$$

As shown, the OLT 710 comprises a photodetector 711 similar to the photodetectors 523 and 623, an amplifier 712 similar to the amplifiers 524 and 624, the filter 713, a signal addition/subtraction unit 714, and an AWG 715. The AWG 715 may be positioned within the OLT 710 as shown in FIG. 7 or external to the OLT 710. The AWG 715 couples the OLT 710 to the ONU 720 via a feeder fiber 771 similar to the feeder fiber 171, the RN 730, and a drop fiber 772 similar to the drop fiber 172. The photodetector 711 is configured to receive an optical signal from the ONU 720. The amplifier 712 is coupled to the photodetector 711 and configured to amplify the received signal. The filter 713 is coupled to the amplifier 712 and configured to filter the received signal to re-construct the reflective crosstalk in the received signal. The signal addition/subtraction unit 714 is coupled to the filter 713 and the amplifier 712 and configured to subtract the reconstructed reflective crosstalk from the received signal. Thus, the recovered signal or the reflective crosstalk post-compensated signal is expressed as shown below:

$$V_{Recovered}(\omega) = H_{EO}(\omega) H_{fiber}(\omega) H_{OE}(\omega) S(\omega). \tag{14}$$

The OLT 710 further comprises a data recovery unit 716 coupled to the single addition/subtraction unit 714 and configured to recover the original data transmitted by the ONU 720 from the reflective crosstalk post-compensated signal. The OLT 710 may perform similar reflective crosstalk post-cancellation for each connected SS-RSOA-based ONU.

Figure 8:
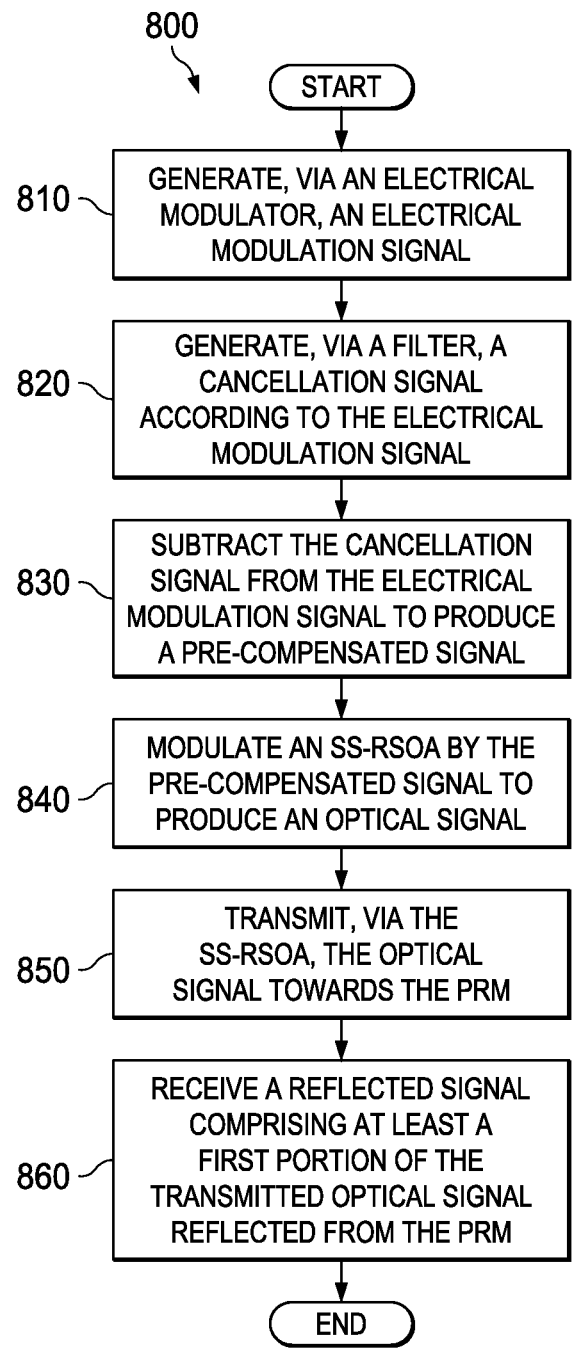
FIG. 8 is a flowchart of a method for performing reflective crosstalk pre-cancellation according to an embodiment of the disclosure.

FIG. 8 is a flowchart of a method 800 for performing reflective crosstalk pre-cancellation according to an embodiment of the disclosure. The method 800 is implemented by an SS-RSOA-based ONU such as the ONUs 120, 320, 420, 520, and 620 when the transmitter generates a signal for transmission. The method 800 employs similar mechanisms as the schemes 300, 400, 500, and 600. For example, the ONU comprises an SS-RSOA such as the RSOAs 121, 321, 421, 521, 621, and 721 coupled to an AWG such as the AWGs 115, 135, 335, 435, 535, 635, and 735, an FR such as the FRs 131 and 331, and a PRM such as the PRMs 132 and 332 to form a self-seeding cavity such as the self-seeding cavities 150, 350, 450, 550, 650, and 750. At step 810, an electrical modulation signal is generated via a signal generator such as the signal generators 328, 428, 528, and 628. For example, the electrical modulation signal carries NRZ data. At step 820, a cancellation signal is generated according to the electrical modulation signal via a filter, which comprises a filter response associated with a round-trip delay between the SS-RSOA and the PRM and a power reflection coefficient of the PRM. For example, the filter response approximates the reflective crosstalk effect in the self-seeding cavity. The filter may be constructed by employing any of the schemes 300, 400, 500, and 600 and may comprise a frequency response as shown in Equations (5), (8), and (9). At step 830, the cancellation signal is subtracted from the electrical modulation signal to produce a pre-compensated signal. At step 840, an SS-RSOA is modulated by the pre-compensated signal to produce an optical signal. At step 850, the optical signal is transmitted towards the PRM by the SS-RSOA. At step 860, a reflected signal comprising at least a first portion of the transmitted optical signal reflected from the PRM is received. It should be noted that the method 800 may be performed in the order as shown or any other suitable order to achieve similar functionalities. In addition, the method 800 is applicable to wireless fronthauls that employ an optical link described more fully below.

Figure 9:
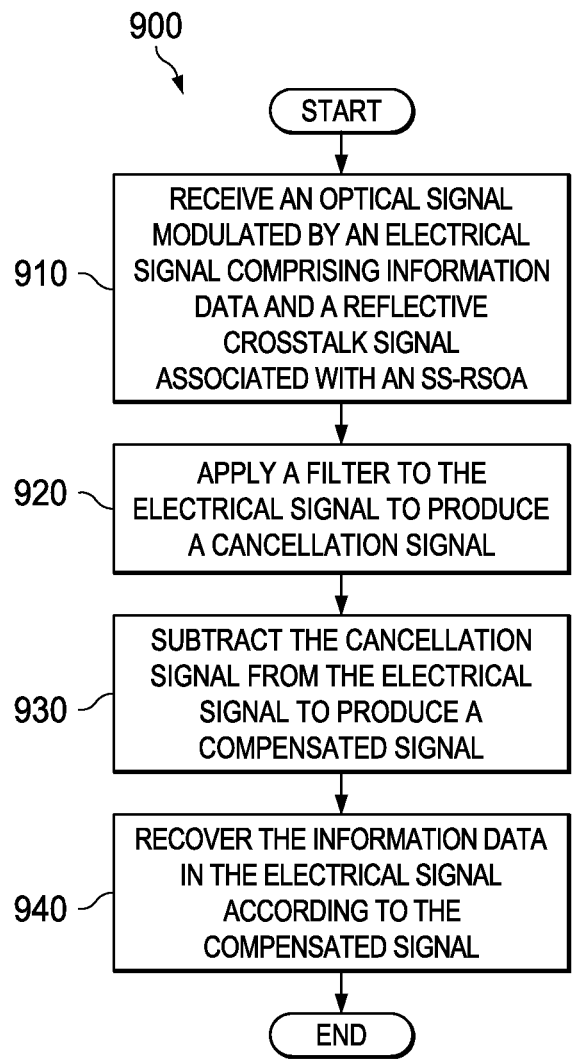
FIG. 9 is a flowchart of a method for performing reflective crosstalk post-cancellation according to an embodiment of the disclosure.

FIG. 9 is a flowchart of a method 900 for performing reflective crosstalk post-cancellation according to an embodiment of the disclosure. The method 900 is implemented by an OLT such as the OLTs 110 and 710 when receiving an optical signal transmitted by an SS-RSOA-based ONU such as the ONUs 120, 320, 420, 520, and 620, and 720. The method 900 employs similar mechanisms as described in the scheme 700. At step 910, an optical signal modulated by an electrical signal comprising information data and a reflective crosstalk signal associated with an SS-RSOA is received. At step 920, a filter is applied to the electrical signal to produce a cancellation signal. For example, the filter comprises an optical-to-optical response of the SS-RSOA as shown in Equation (13). At step 930, the cancellation signal is subtracted from the electrical signal to produce a post-compensated signal. At step 940, the information data in the electrical signal is recovered according to the compensated signal. The steps of the method 900 may be performed in the order as shown or any other suitable order to achieve similar functionalities. In addition, the method 900 is applicable to wireless fronthauls that employ an optical link described more fully below.

FIGS. 10A-D illustrate the effect of reflective crosstalk cancellation for an SS-RSOA such as the RSOAs 121, 321, 421, 521, 621, and 721. The reflective crosstalk cancellation is implemented by employing the FDM approach as described in the scheme 400. The reflective crosstalk responses are generated from a similar set up as employed for generating the graphs 210, 230, 250, and 270. For example, the SS-RSOA is configured to couple to an AWG such as the AWGs 115, 135, 335, 435, 535, 635, and 735, an FR such as the FRs 131 and 331, and a PRM such as the PRMs 132 and 332. In FIGS. 10A-D, the x-axis represents time in units of ns, the left y-axis represents voltages in units of V, and the right y-axis represents optical power in units of mW.

FIG. 10A is a graph 1010 illustrating a pulse response 1020 of the SS-RSOA with FDM-based feedforward pre-cancellation according to an embodiment of the disclosure. The electrical modulation signal 1019, shown as a solid curve, is applied to the SS-RSOA. The pulse response 1020, shown as a dotted curve, is measured at the output of the SS-RSOA when the SS-RSOA is under a bias current of about 25 mA. The electrical modulation signal 1019 comprises a first electrical pulse 1011, which is a positive pulse, for direct modulation and a second electrical pulse 1012 for reflective crosstalk mitigation. The second electrical pulse 1012 is generated from the delay and differentiation of the first electrical pulse 1011. For example, the second electrical pulse 1012 is generated by filtering the first electrical pulse 1011 by a filter such as the filter 522. The optical pulse, generated from direct modulation with the first electrical pulse 1011, is partially transmitted through the PRM and partially reflected back to the RSOA. After a round-trip inside the cavity, the reflected signal enters the RSOA. At the same time, the crosstalk cancellation signal, which is the second electrical pulse 1012, generated from the feedforward path, is applied to the RSOA. Thus, the crosstalk cancellation signal suppresses the reflected signal. As shown, the second electrical pulse 1012, which is the crosstalk cancellation signal, comprises positive and negative components. When the crosstalk cancellation signal is applied to the RSOA, an opposite pulse is generated inside the RSOA, which expedites the carrier recovery inside the RSOA, and sets the carrier density back to the steady-state level under a fixed bias current, and thus the reflected pulse from the first electrical pulse 1011 and subsequent pulses are suppressed. In the pulse response 1020, the first pulse 1021 is the output signal of the electrical driving signal pulse 1011 under direct modulation, and the subsequent pulses 1022, 1023, 1024, and 1025 are the residual reflective crosstalk. Comparing the pulse response 1020 to the pulse response 220, the FDM approach significantly reduces the reflective crosstalk.

FIG. 10B is a graph 1030 illustrating a pulse response 1040 of the SS-RSOA with FDM-based feedforward pre-cancellation according to another embodiment of the disclosure. The electrical modulation signal 1039, shown as a solid curve, is applied to the SS-RSOA. The pulse response 1040, shown as a dotted curve, is measured at the output of the SS-RSOA when the SS-RSOA is under a bias current of about 50 mA. The electrical modulation signal 1039 comprises a first electrical pulse 1031 similar to the first electrical pulse 1011 for direct modulation and a second electrical pulse 1032 for reflective crosstalk mitigation. In the pulse response 1040, the first pulse 1041 is the output signal of the first electrical pulse 1011 under direct modulation. As shown in the pulse response 1040, at the high bias current, the residual reflective crosstalk is almost zero.

Figure 10C:
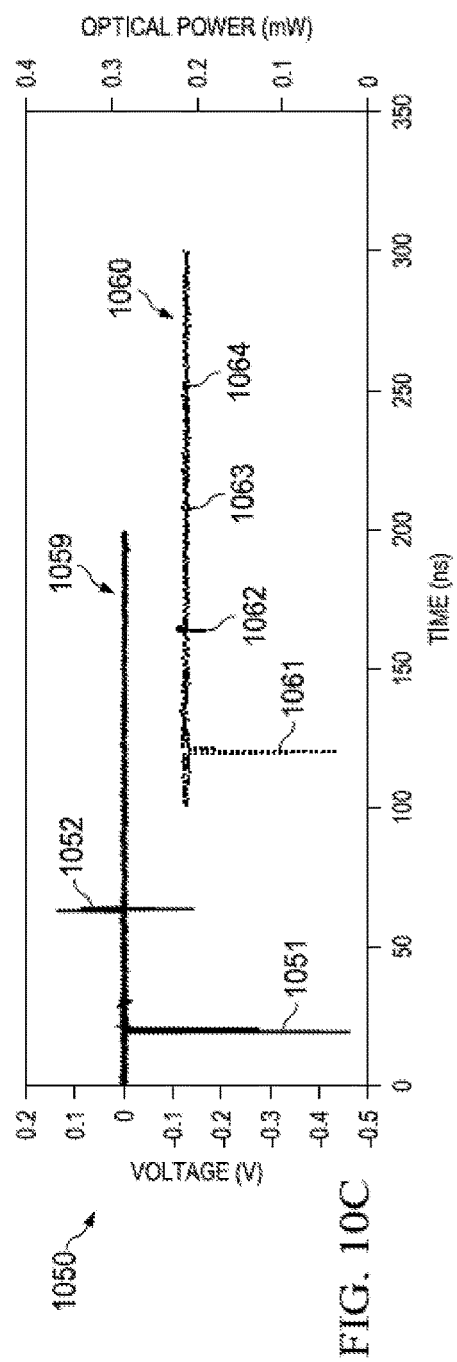
FIG. 10C is a graph illustrating a pulse response of an SS-RSOA with FDM-based feedforward pre-cancellation according to another embodiment of the disclosure.

FIG. 10C is a graph 1050 illustrating a pulse response 1060 of the SS-RSOA with FDM-based feedforward pre-cancellation according to another embodiment of the disclosure. The electrical modulation signal 1059, shown as a solid curve, is applied to the SS-RSOA. The pulse response 1060, shown as a dotted curve, is measured at the output of the SS-RSOA when the SS-RSOA is under a bias current of about 75 mA. The electrical modulation signal 1059 comprises a first electrical pulse 1051, which is a negative pulse, for direct modulation and a second electrical pulse 1052 for reflective crosstalk mitigation. In the pulse response 1060, the first pulse 1061 is the output signal of the first electrical pulse 1051 under direct modulation, and the subsequent pulses 1062, 1063, and 1064 are the residual reflective crosstalk. Comparing the pulse response 1060 to the pulse response 260, the FDM approach significantly reduces the reflective crosstalk.

Figure 10D:
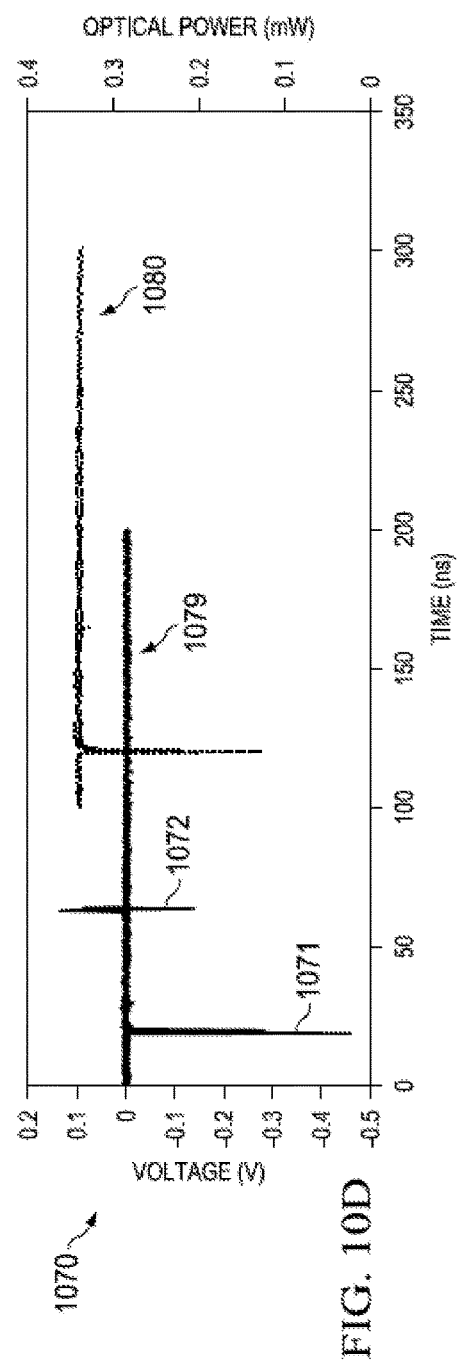
FIG. 10D is a graph illustrating a pulse response of an SS-RSOA with FDM-based feedforward pre-cancellation according to another embodiment of the disclosure.

FIG. 10D is a graph 1070 illustrating a pulse response 1080 of the SS-RSOA with FDM-based feedforward pre-cancellation according to another embodiment of the disclosure. The electrical modulation signal 1079, shown as a solid curve, is applied to the SS-RSOA. The pulse response 1080, shown as a dotted curve, is measured at the output of the SS-RSOA when the SS-RSOA is under a bias current of about 75 mA. The electrical modulation signal 1079 comprises a first electrical pulse 1071 similar to the first electrical pulse 1051 for direct modulation and a second electrical pulse 1072 for reflective crosstalk mitigation. As shown in the pulse response 1080, at the high bias current, the residual reflective crosstalk is almost zero. As shown in the FIGS. 10A-D, the FDM approach significantly reduces reflective crosstalk for positive and negative electrical driving signal pulses under all bias currents when comparing the pulse responses 1020, 1040, 1060, and 1080 to the pulse responses 320, 340, 360, and 380.

FIGS. 11A-B and 12A-B illustrate the performance improvements provided by the FDM approach described in the scheme 400 under continuous modulation in terms of eye diagrams and BER measurements. To evaluate the performance improvements, an SS-RSOA-based ONU similar to the ONU 520 is placed in a 32-channel WDM PON similar to the WDM PON 100, where the ONU is configured to transmit at channel number 16. The channels in the WDM PON are 2.5 Gb/s channels, the channel spacing is about 100 gigahertz (GHz), and channel 16 is centered at about 1,545.32 nanometers (nm). The SS-RSOA-based ONU comprises a feedforward crosstalk cancellation filter similar to the filter 522 in a feedforward path as shown in the scheme 400. The SS-RSOA ONU is biased at about 50 mA and directly modulated with $2^{15}$ pseudo-random bit sequences using a 50 mA peak-to-peak modulation current. To illustrate the performance of the FDM, eye diagrams are captured at a receiver such as an OLT 110 receiver connected to the output of the SS-RSOA-based ONU when employing the feedforward reflective crosstalk cancellation filter and when bypassing the feedforward crosstalk cancellation filter. In the FIGS. 11A-B and 12A-B, the x-axis represents time in units of 100 ps, and the y-axis represents normalized received power in some constant units.

Figure 11A:
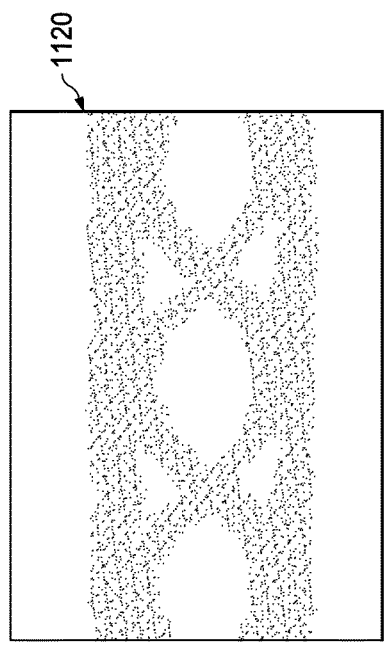
FIG. 11A is an eye diagram of an SS-RSOA without FDM-based feedforward pre-cancellation according to an embodiment of the disclosure.

FIG. 11A is an eye diagram 1110 of an SS-RSOA without FDM-based feedforward reflective crosstalk pre-cancellation according to an embodiment of the disclosure. The eye diagram 1110 is captured with the ONU bypassing the feedforward crosstalk cancellation filter. The eye diagram 1110 shows an extinction ratio (ER) of about 6 decibels (dB).

Figure 11B:
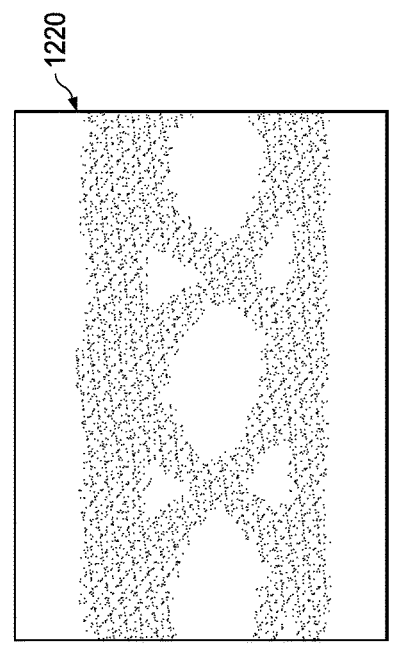
FIG. 11B is an eye diagram of an SS-RSOA with FDM-based feedforward pre-cancellation according to an embodiment of the disclosure.

FIG. 11B is an eye diagram 1120 of an SS-RSOA with FDM-based feedforward reflective crosstalk pre-cancellation according to an embodiment of the disclosure. The eye diagram 1120 is captured with the ONU employing the feedforward crosstalk cancellation filter in the feedforward path. As described above in Equation (8), the feedforward crosstalk cancellation filter response includes an attenuation coefficient, A, and a delay, $\tau$. The eye diagram 1120 is captured by manually controlling A and $\tau$ of the feedforward crosstalk cancellation filter to produce a reflective crosstalk estimate that closely resembles the actual reflect crosstalk in the SS-RSOA. For example, the attenuation coefficient is manually controlled with a relative accuracy of about 5%, and the delay is adjusted in steps of about 100 ps. Similar to the eye diagram 1110, the eye diagram 1120 also shows an ER of about 6 dB. However, the eye diagram 1120 is less noisy than the eye diagram 1110 because the reflective crosstalk is reduced by the employment of the feedforward crosstalk cancellation filter.

Figure 12A:
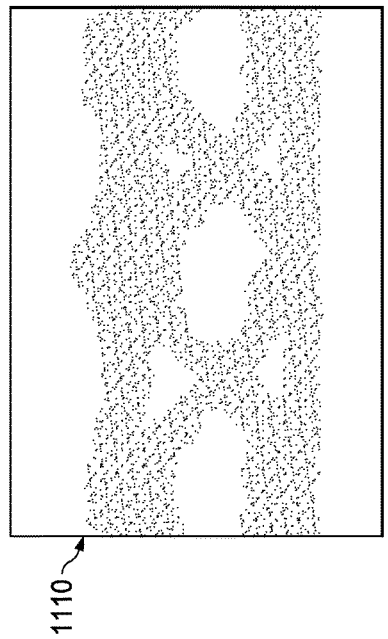
FIG. 12A is an eye diagram of an SS-RSOA without FDM-based feedforward pre-cancellation according to another embodiment of the disclosure

FIG. 12A is an eye diagram 1210 of the SS-RSOA without FDM-based feedforward reflective crosstalk cancellation according to another embodiment of the disclosure. The eye diagram 1210 is captured with the ONU bypassing the feedforward crosstalk cancellation filter. The eye diagram 1210 shows an ER of about 6.8 dB.

Figure 12B:
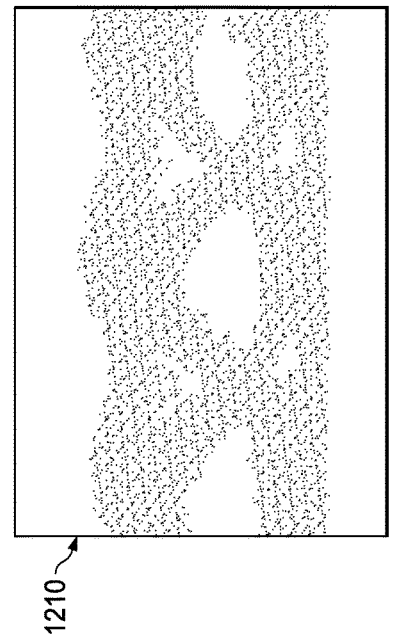
FIG. 12B is an eye diagram of an SS-RSOA with FDM-based feedforward pre-cancellation according to another embodiment of the disclosure.

FIG. 12B is an eye diagram 1220 of the SS-RSOA with FDM-based feedforward reflective crosstalk cancellation according to another embodiment of the disclosure. The eye diagram 1220 is captured with the ONU employing the feedforward crosstalk cancellation filter, where the feedforward crosstalk cancellation filter is configured by adjusting the attenuation coefficient and the delay of the feedforward crosstalk cancellation filter. Similar to the eye diagram 1210, the eye diagram 1220 also shows an ER of about 6.8 dB. However, the eye diagram 1220 is less noisy than the eye diagram 1210 because the reflective crosstalk is reduced by the employment of the feedforward crosstalk cancellation filter.

Figure 13:
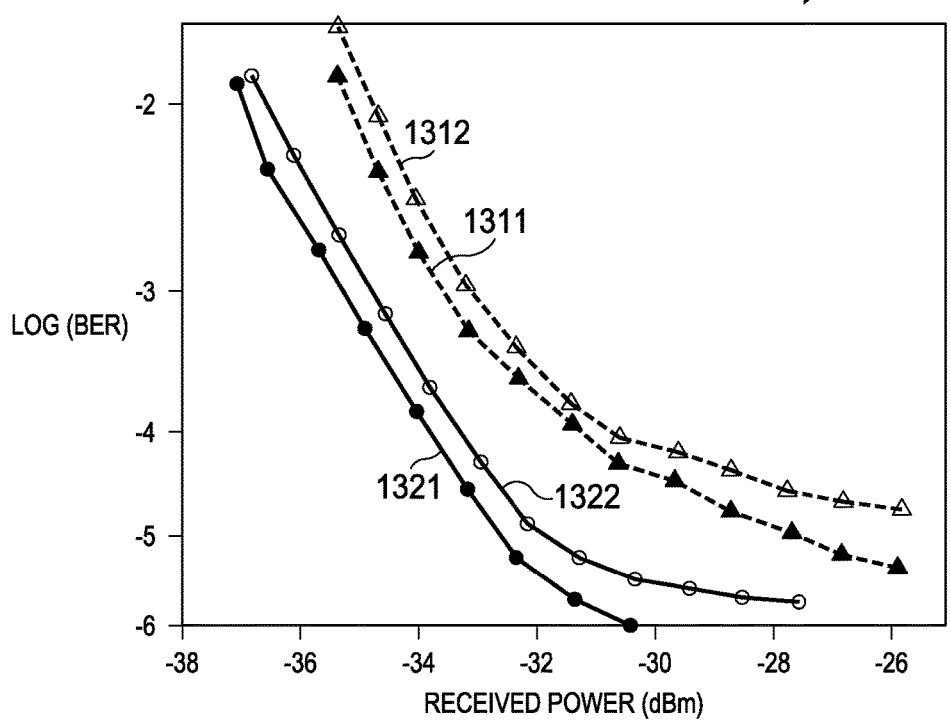
FIG. 13 is a graph comparing bit error ratio (BER) performances with and without FDM-based feedforward pre-cancellation according to an embodiment of the disclosure.

FIG. 13 is a graph 1300 comparing BER performances with and without FDM-based feedforward reflective crosstalk pre-cancellation according to an embodiment of the disclosure. The FDM-based feedforward reflective crosstalk pre-cancellation is similar to the scheme 400. The x-axis represents received power in units of dB milliwatts (dBm), and the y-axis represents BER in a logarithmic scale. The graph 1300 is generated by employing an SS-RSOA-based ONU such as the ONU 420 to generate NRZ modulation signal at a transmission rate of about 2.5 Gb/s and measuring BER at a receiver when the receiver is directly connected to the ONU and when the receiver is connected to the ONU via an about 20 kilometer (km) standard single-mode fiber (SSMF) link. In the graph 1300, the curves 1311 and 1312, shown as dotted curves, show BER captured at the directly connected receiver with and without the ONU performing the FDM-based feedforward reflective crosstalk pre-cancellation, respectively. The curves 1321 and 1322, shown as solid curves, show BER captured at the receiver connected to the 20 km SSMF link with and without the ONU performing the FDM-based feedforward reflective crosstalk pre-cancellation, respectively. As shown, the sensitivity at a BER of $10^{-3}$ is about −34.8 dBm with the employment of the FDM-based feedforward reflective crosstalk pre-cancellation and about −33.1 dBm without the employment of the FDM-based feedforward reflective crosstalk pre-cancellation. Thus, the FDM-based feedforward crosstalk pre-cancellation improves the transmission performance by about 1.7 dB.

Figure 14:
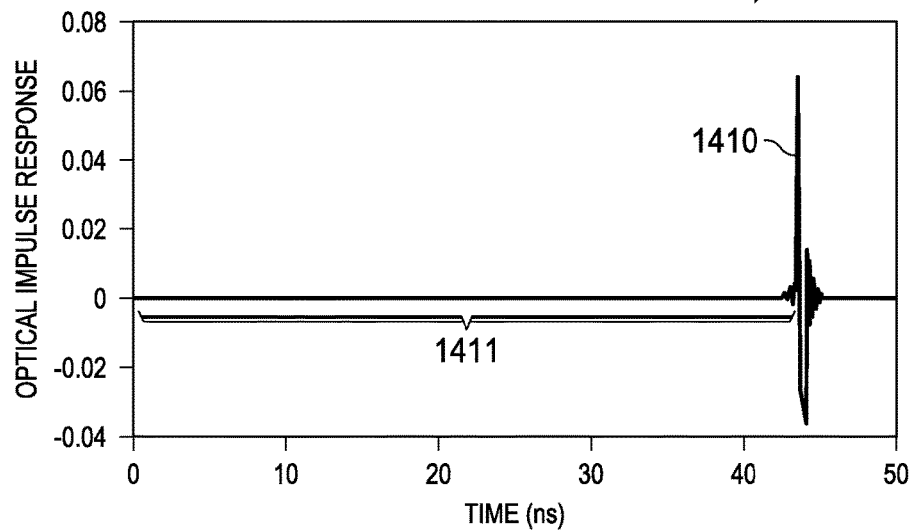
FIG. 14 is a graph illustrating a measured optical impulse response of an SS-RSOA according to an embodiment of the disclosure.

FIG. 14 is a graph 1400 illustrating an optical impulse response 1410 of an SS-RSOA according to an embodiment of the disclosure. The SS-RSOA is similar to the RSOAs 121, 321, 421, 521, 621, and 721. The SS-RSOA is configured to operate in a self-seeding cavity such as the self-seeding cavities 150, 350, 450, 550, 650, and 750. The SS-RSOA comprises a reflective pulse response similar to the pulse responses 220, 240, 260, and 280. The optical impulse response 1410 is measured and computed from the SS-RSOA for determining a filter response for a feedforward reflective crosstalk cancellation filter such as the filters 322, 422, 522, and 622 when employing the schemes 300, 400, 500, and 600. As shown, the optical impulse response 1410 shows a delay 1411 of about 49 ns, which is the round-trip delay of the self-seeding cavity.

Figure 15:
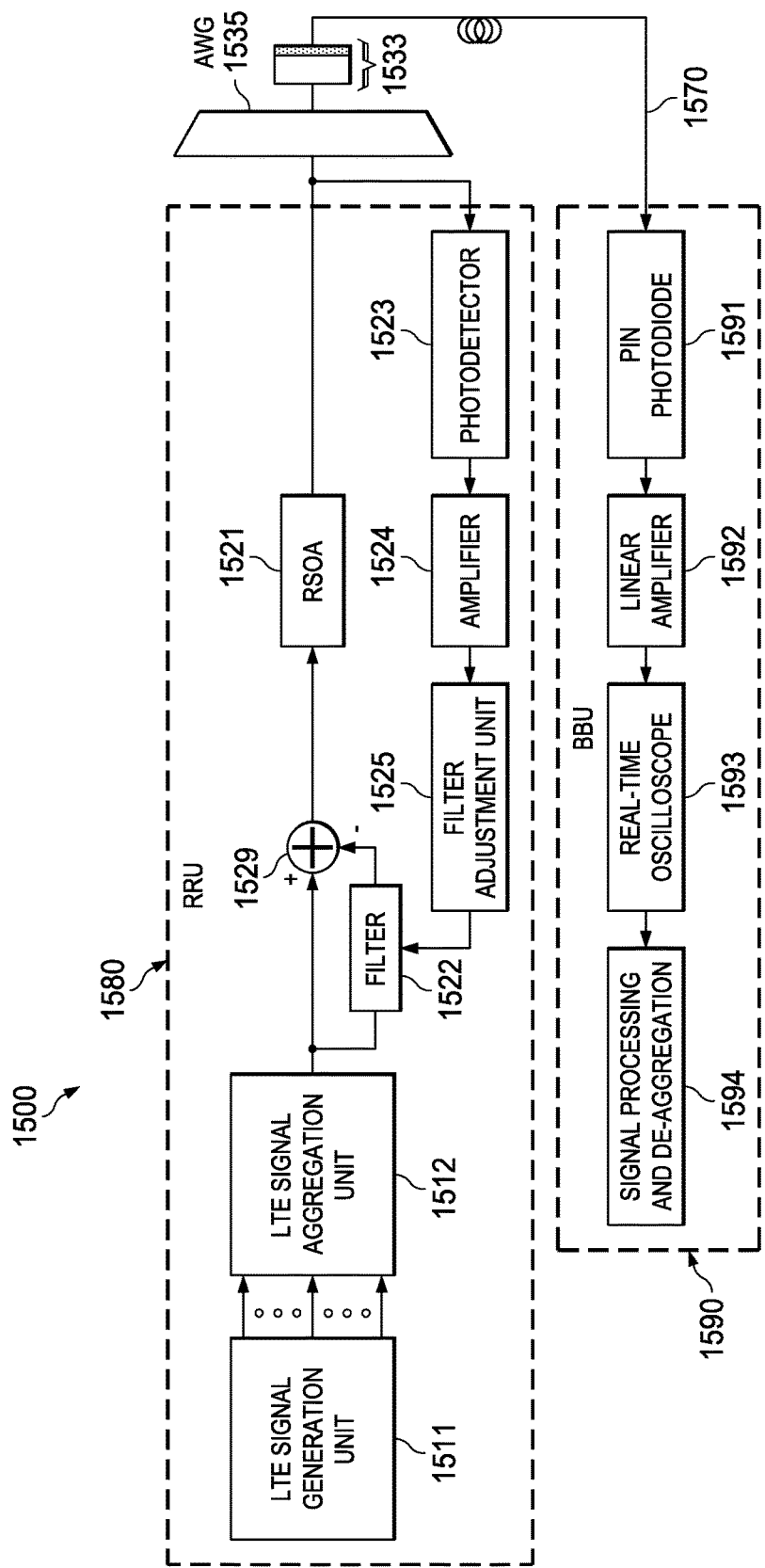
FIG. 15 is a schematic diagram of an experimental setup of a self-seeded wireless fronthaul implementing feedforward reflective crosstalk pre-cancellation according to an embodiment of the disclosure.

FIG. 15 is a schematic diagram of an experimental set up 1500 of a self-seeded wireless fronthaul implementing reflective crosstalk pre-cancellation according to an embodiment of the disclosure. The reflective crosstalk cancellation is based on the adaptive feedback approach described in the scheme 500. The experimental set up 1500 is constructed to emulate a centralized-radio access network (C-RAN) configuration. The experimental setup 1500 comprises a C-RAN remote radio unit (RRU) 1580 coupled to a C-RAN baseband unit (BBU) 1590 via an about 20 km SSMF 1570, an AWG 1535, and an FRM 1533. The AWG 1535 is similar to the AWGs 115, 135, 335, 435, 535, 635, and 735. The FRM 1533 is similar to the FRMs 133, 333, 433, 533, 633, and 733. The RRU 1580 comprises an LTE signal generation unit 1511 and an LTE signal aggregation unit 1512. The LTE signal generation unit 1511 generates 24 LTE channel signals with quadrature phase-shift keying (QPSK), 16-QAM, and 64-quadrature amplitude modulation (64-QAM) modulation and about 20 megahertz (MHz) effective channel bandwidth. The LTE signal aggregation unit 1512 is coupled to the LTE signal generation unit 1511 and configured to aggregate the 24 LTE channel signals in basebands or other suitable intermediate bands. The aggregation may be performed via various mechanisms such as FDM or time-division multiplexing (TDM). The aggregated signal may be further encoded according to a common public radio interface (CPRI) protocol.

The RRU 1580 further comprises a reflective crosstalk cancellation filter 1522, an RSOA 1521, a signal addition/subtraction unit 1529, a photodetector 1523, an amplifier 1524, and a filter adjustment unit 1525 arranged in a similar arrangement as shown in the scheme 500. The RSOA 1521 is similar to the RSOAs 121, 321, 421, 521, 621, and 721. The filter 1522 is similar to the filter 522. The filter adjustment unit 1525 determines the RSOA 1521 response based on a signal received from the output of the RSOA 1521 via the photodetector 1523 and the amplifier 1524. The filter adjustment unit 1525 updates the filter 1522 to adapt to the RSOA 1521 response. To provide crosstalk pre-cancellation or pre-compensation, the aggregated LTE signal is filtered by the filter 1522 and the signal addition/subtraction unit 1529 subtracts the filter 1522 output from the aggregated LTE signal to produce a crosstalk pre-compensated signal. The crosstalk pre-compensated signal directly modulates the RSOA 1521 and is transmitted to the BBU 1590 via the SSMF 1570. The output power at the output of the FRM 1533 is about −4.2 dBm at a wavelength of about 1545.32 nm. In the experimental set up 1500, the LTE signal generation unit 1511 and the LTE signal aggregation unit 1512 are offline generation units, where the 24 LTE channel signals are generated and aggregated offline and playback from an arbitrary waveform generator.

The BBU 1590 comprises a p-type/intrinsic/n-type (PIN) photodiode 1591, a linear amplifier 1592, a real-time oscilloscope 1593, and a signal processing and de-aggregation unit 1594. The PIN photodiode 1591 is similar to the photodetectors 523, 623, and 711. The linear amplifier 1592 is similar to the amplifiers 524, 624, and 712. The PIN photodiode 1591 receives and detects the optical signal carrying the aggregated LTE signal from the RRU 1580 and converts the received optical signal into an electrical signal. The linear amplifier 1592 amplifies the received signal. The real-time oscilloscope 1593 samples the amplified received signal at a sampling rate of about 20 gigasamples per second (GS/s). The signal processing and de-aggregation unit 1594 processes the sampled signal and performs LTE signal de-aggregation. It should be noted that the BBU 1590 may also perform reflective crosstalk post-cancellation as described in the scheme 800.

FIG. 16 is a graph 1600 illustrating a measured RF spectrum of an aggregated LTE signal captured from the experimental set up 1500 according to an embodiment of the disclosure. The x-axis represents frequency in units of MHz, and the y-axis represents relative power in units of dB. The plot 1610 shows the RF spectrum of the aggregated LTE signal received at the BBU 1590 before channel de-aggregation. The aggregated LTE signal carries the 24 LTE channel signals generated by the RRU 1580, where each LTE channel signal comprises a bandwidth of about 20 MHz. As shown, the aggregated LTE channel signal spans a bandwidth of about 800 MHz, which is below the 3 dB bandwidth of the RSOA 1521 with a self-seeded light source.

Figure 17A:
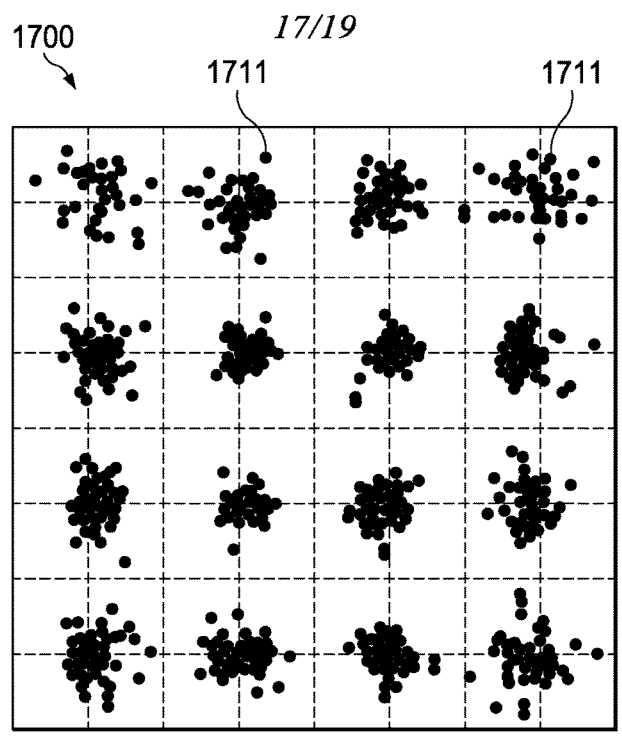
FIG. 17A is a constellation diagram of a recovered 16-quadrature amplitude modulation (16-QAM) coded LTE signal without adaptive reflective crosstalk pre-cancellation captured from the experimental set up of FIG. 15 according to an embodiment of the disclosure.

FIGS. 17A and B illustrate the performance improvements provided by the adaptive reflective crosstalk pre-cancellation described in the scheme 600 in terms of constellation plots. In the FIGS. 17A and B, the x-axis represents in-phase (I) components and the y-axis represents quadrature (Q) components, where the x-axis and the y-axis are in some constant units. FIG. 17A is a constellation diagram 1700 of a recovered 16-QAM coded LTE signal captured from the experimental set up 1500 without adaptive reflective crosstalk pre-cancellation according to an embodiment of the disclosure. The constellation diagram 1700 is measured at the BBU 1590 when the RRU 1580 bypasses the adaptive reflective crosstalk cancellation filter 1522. The received optical power is at about −12 dBm. As shown, the constellation points 1711 are slightly scattered, which is due to reflective crosstalk noise in the transmission.

Figure 17B:
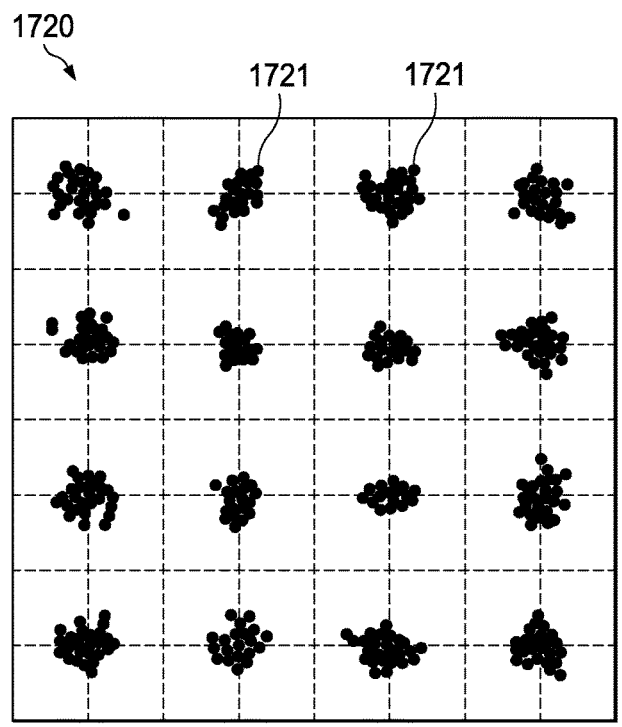
FIG. 17B is a constellation diagram of a recovered 16-QAM coded LTE signal with adaptive reflective crosstalk pre-cancellation captured from the experimental set up of FIG. 15 according to an embodiment of the disclosure.

FIG. 17B is a constellation diagram 1720 of a recovered 16-QAM coded LTE signal captured from the experimental set up 1500 with adaptive reflective crosstalk pre-cancellation according to an embodiment of the disclosure. The constellation diagram 1720 is measured at the BBU 1590 when the RRU 1580 employs the adaptive reflective crosstalk cancellation filter 1522. As shown, the constellation points 1721 are grouped relatively tight together after the reflective crosstalk noise is cancelled by the adaptive reflective crosstalk cancellation filter 1522. Comparing the constellation diagrams 1700 and 1720, the constellation diagram 1720 with the adaptive reflective crosstalk pre-cancellation is significantly less noisy. The adaptive reflective crosstalk pre-cancellation also provides significant performance improvement for QAM-coded and 64-QAM-coded LTE signal.

Figure 18:
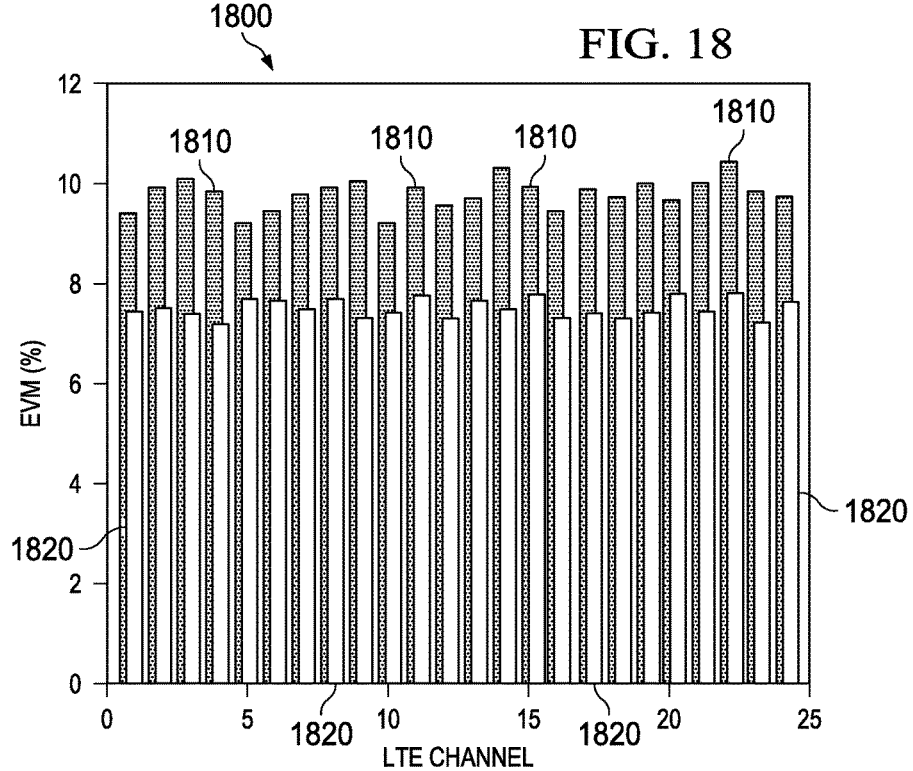
FIG. 18 is a graph comparing error vector magnitudes (EVM) performances of 24 de-aggregated LTE signals with and without adaptive reflective crosstalk pre-cancellation captured from the experimental set up of FIG. 15 according to an embodiment of the disclosure.

FIG. 18 is a graph 1800 comparing EVM performances of 24 de-aggregated LTE signals with and without adaptive reflective crosstalk pre-cancellation captured from the experimental set up 1500 according to an embodiment of the disclosure. The x-axis represents LTE channel, and the y-axis represents EVM in units of %. The bars 1810 show EVM measured at the BBU emulation unit 1590 when the RRU emulation unit 1580 bypasses the adaptive reflective crosstalk cancellation filter 1522. The bars 1820 show EVM measured at the BBU 1590 when the RRU 1580 employs the adaptive reflective crosstalk cancellation filter 1522. Comparing the bars 1810 to 1820, the adaptive reflective crosstalk pre-cancellation improves the EVM performance by an average of about 20% for all 24 LTE channels.

Figure 19:
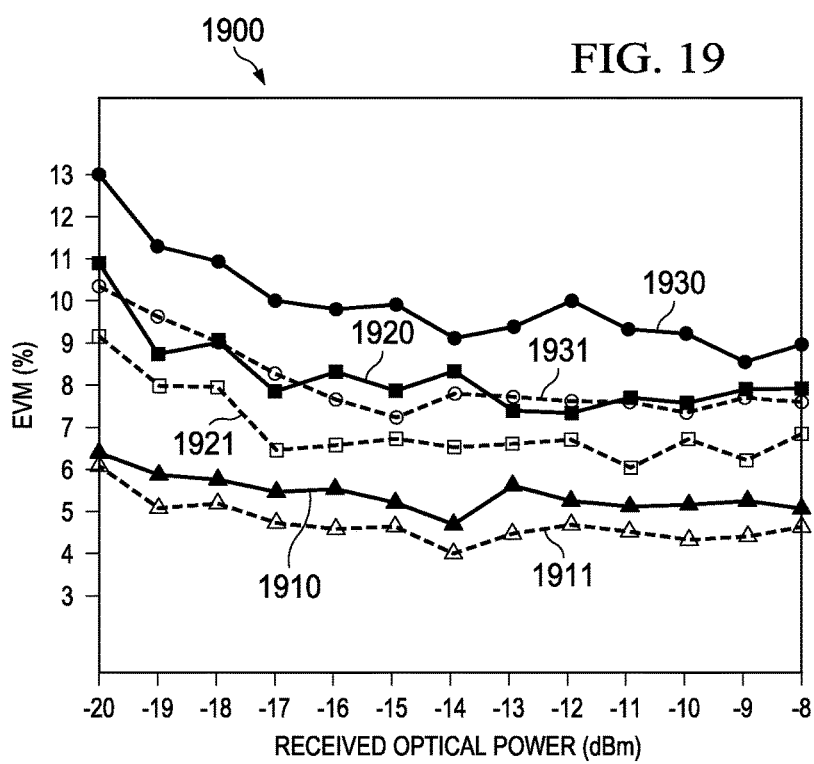
FIG. 19 is a graph comparing EVM performances of aggregated LTE signals with and without adaptive reflective crosstalk pre-cancellation captured from the experimental set up of FIG. 15 according to an embodiment of the disclosure.

FIG. 19 is a graph 1900 comparing EVM performances of 8, 16, and 24 aggregated LTE signals captured from the experimental set up 1500 according to an embodiment of the disclosure. The x-axis represents received optical power in units of dBm, and the y-axis represents EVM in units of %. The plots 1910 and 1911 show EVM of 8 aggregated LTE channel signals measured at the BBU 1590 with and without the RRU 1580 employing the adaptive reflective crosstalk cancellation filter 1522, respectively. The plots 1920 and 1921 show EVM of 16 aggregated LTE channel signals measured at the BBU emulation unit 1590 with and without the RRU 1580 employing the adaptive reflective crosstalk cancellation filter 1522, respectively. The plots 1930 and 1931 show EVM of 8 aggregated LTE channel signals measured at the BBU 1590 with and without the RRU 1580 employing the adaptive reflective crosstalk cancellation filter 1522, respectively. As shown, the EVM degrades when more LTE channel signals are aggregated and transmitted through the SS-RSOA 1521. However, the adaptive reflective crosstalk pre-cancellation provides more significant EVM improvement when more LTE channel signals are aggregated and transmitted through the SS-RSOA 1521.

Figure 20:
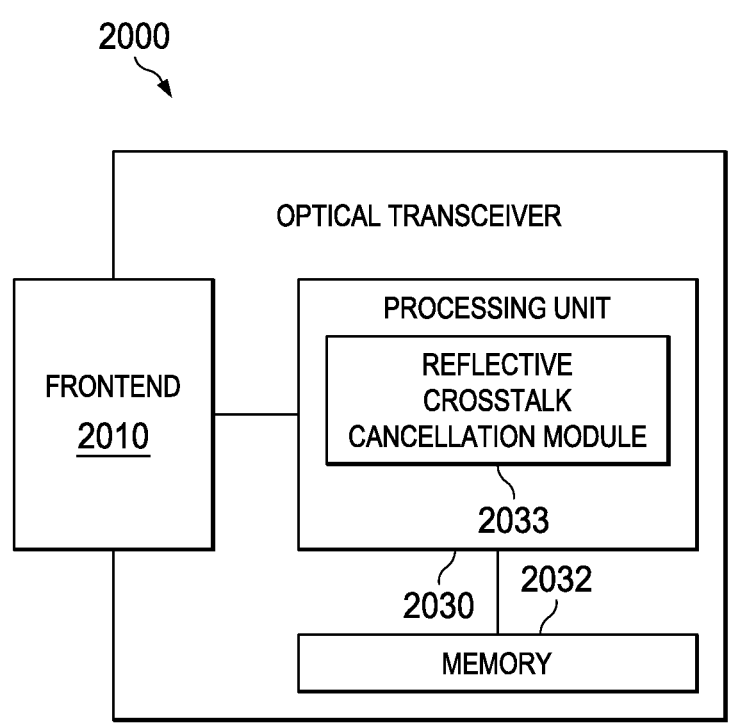
FIG. 20 is a schematic diagram of an optical transceiver unit.

FIG. 20 is a schematic diagram of an embodiment of an optical transceiver unit 2000, which may be any device that transmits and/or receives optical signals. For example, the transceiver unit 2000 may be located in an optical communication device, such as the ONUs 120, 320, 420, 520, 620, and 720, the OLTs 110 and 710, the RRU 1580, and the BBU 1590. The transceiver unit 2000 may also be configured to implement or support any of the described schemes. One skilled in the art will recognize that the term "transceiver unit" encompasses a broad range of devices of which transceiver unit 2000 is merely an example. The transceiver unit 2000 is included for purposes of clarity of discussion, but is in no way meant to limit the application of the present disclosure to a particular transceiver unit embodiment or class of transceiver unit embodiments. At least some of the features and methods described in the disclosure may be implemented in a network apparatus or component such as a transceiver unit 2000. For instance, the features and methods in the disclosure may be implemented using hardware, firmware, and/or software installed to run on hardware. As shown in FIG. 20, the transceiver unit 2000 may comprise one or more frontends 2010. The frontends 2010 may comprise an optical frontend (not shown) and an RF frontend (not shown). For example, the optical frontend 2010 may comprise RSOAs such as the RSOAs 121, 321, 421, 521, 621, and 721, photodetectors such as the photodetectors 523, 623, 711, 1591, amplifiers such as the amplifiers 524, 624, 712, and 1592, and any other electrical-to-optical (E/O) components and optical-to-electrical (O/E) components. A processing unit 2030 may be coupled to the frontends 2010.

The processing unit 2030 may comprise one or more processors, which may include general processors, single-core processors, multi-core processors, application specific integrated circuits (ASICs), and/or DSPs. The processing unit 2030 may comprise a reflective crosstalk cancellation module 2033, which may implement the methods 800 and 900, and/or any flowcharts, schemes, and methods described herein. In an alternative embodiment, the reflective crosstalk cancellation module 2033 may be implemented as instructions stored in the memory module 2032, which may be executed by the processing unit 2030. The memory module 2032 may comprise a cache for temporarily storing content, for example, a random-access memory (RAM). Additionally, the memory module 2032 may comprise a long-term storage for storing content relatively longer, for example, a read-only memory (ROM). For instance, the cache and the long-term storage may include dynamic RAMs (DRAMs), solid-state drives (SSDs), hard disks, or combinations thereof.

It is understood that by programming and/or loading executable instructions onto the transceiver unit 2000, at least one of the processing unit 2030 and/or memory module 2032 are changed, transforming the transceiver unit 2000 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a signal generator configured to produce a modulation signal;
    a filter coupled to the signal generator and configured to filter the modulation signal to produce a cancellation signal; and
    a reflective semiconductor optical amplifier (RSOA) coupled to the signal generator and the filter, wherein the RSOA is configured to:
        generate an optical signal according to a difference between the modulation signal and the cancellation signal; and
        transmit the optical signal towards a partial reflection mirror (PRM),
    wherein the filter comprises a filter response comprising:
        an optical-to-optical response of the RSOA;
        a scaling component associated with a power reflection coefficient of the PRM; and
        a delay component associated with a round-trip delay between the RSOA and the PRM.

2. The apparatus of claim 1, wherein the RSOA is further configured to receive a reflected signal comprising a portion of the optical signal reflected from the PRM, and wherein the cancellation signal is an estimate of a previous reflected signal.

3. The apparatus of claim 1, wherein the filter comprises:
    an attenuator configured to attenuate the modulation signal;
    a delay unit coupled to the attenuator and configured to delay the modulation signal by a time duration equal to the round-trip delay; and
    a differentiator configured to apply a differentiation operation on the modulation signal.

4. The apparatus of claim 1, wherein the filter is an analog filter.

5. The apparatus of claim 1, wherein the filter is a digital filter.

6. The apparatus of claim 1, wherein the apparatus is a wavelength-division multiplexing passive optical network (WDM PON) optical network unit (ONU).

7. The apparatus of claim 1, wherein the apparatus is a mobile fronthaul equipment, and wherein the modulation signal comprises aggregated radio wireless channel signals.

8. The apparatus of claim 1, wherein the RSOA is a self-seeded RSOA (SS-RSOA).

9. The apparatus of claim 8, wherein the SS-RSOA is coupled to the PRM via an optical fiber and an arrayed waveguide grating (AWG), and wherein the filter response in a frequency domain is represented by:

$$H(\omega)=kRH_o(\omega)\exp(-j\omega\tau),$$

where $\exp(-j\omega\tau)$ is a frequency response of the round-trip delay, denoted as $\tau$, between the SS-RSOA and the PRM, $H_o(\omega)$ is an optical-to-optical frequency response of the SS-RSOA, R is the power reflection coefficient of the PRM, and k comprises a power-frequency response of the optical fiber and the AWG.

10. The apparatus of claim 8, wherein the filter response in a frequency domain is represented by:

$$H(\omega)=j\omega A\exp(-j\omega\tau),$$

where $j\omega$ represents differentiation in a time domain that approximates an optical-to-optical frequency response of the SS-RSOA, A is an attenuation coefficient associated with the power reflection coefficient of the PRM and an optical link between the SS-RSOA and the PRM, and $\exp(-j\omega\tau)$ is a frequency response of the round-trip delay, denoted as $\tau$, between the SS-RSOA and the PRM.

11. The apparatus of claim 10, wherein the filter is further configured to adjust the attenuation coefficient A according to a bias current of the SS-RSOA.

12. An apparatus comprising:
    a signal generator configured to produce a modulation signal;
    a filter coupled to the signal generator and configured to filter the modulation signal to produce a cancellation signal;
    a reflective semiconductor optical amplifier (RSOA) coupled to the signal generator and the filter, wherein the RSOA is configured to:
        generate an optical signal according to a difference between the modulation signal and the cancellation signal;
        transmit the optical signal towards a partial reflection mirror (PRM); and
        receive a reflected signal comprising at least a first portion of the optical signal reflected from the PRM;
    a photodetector coupled to the RSOA and configured to receive a feedback signal comprising at least a second portion of the optical signal and at least a third portion of the reflected signal; and
    a filter adjustment unit coupled to the photodetector and the filter, wherein the filter adjustment unit is configured to adjust the filter according to the feedback signal received from the photodetector.

13. The apparatus of claim 12, wherein the filter comprises a filter response represented in a frequency domain by:

$$H(f)=H_e^{-1}(f)H_o(f),$$

where $H_e^{-1}(f)$ is an inverse of an electrical-to-optical response of the RSOA and $H_o(f)$ is an optical-to-optical response of the RSOA.

14. A method comprising:
    generating, via a signal generator, an electrical modulation signal;
    generating, via a filter, a cancellation signal according to the electrical modulation signal;
    subtracting the cancellation signal from the electrical modulation signal to produce a pre-compensated signal; and
    modulating a self-seeded reflective semiconductor optical amplifier (SS-RSOA) according to the pre-compensated signal to produce an optical signal, wherein the filter comprises a filter response associated with a round-trip delay between the SS-RSOA and a power reflection coefficient of a partial reflection mirror (PRM).

15. The method of claim 14, wherein the generating the cancellation signal comprises filtering the electrical modulation signal by the filter.

16. The method of claim 14, wherein the SS-RSOA is coupled to the PRM via an optical fiber and an arrayed waveguide grating (AWG), and wherein the filter response in a frequency domain is represented by:

$$H(\omega)=kRH_o(\omega)\exp(-j\omega\tau),$$

where $\exp(-j\omega\tau)$ is a frequency response of the round-trip delay, denoted as $\tau$, between the SS-RSOA and the PRM, $H_o(\omega)$ is an optical-to-optical frequency response of the SS-RSOA, R is the power reflection coefficient, and k comprises a power-frequency response of the optical fiber and the AWG.

17. The method of claim 14, wherein the filter response in a frequency domain is represented by:

$$H(\omega)=j\omega A\exp(-j\omega\tau),$$

where $j\omega$ represents differentiation in a time domain that approximates an optical-to-optical frequency response of the SS-RSOA, A is an attenuation coefficient associated with the power reflection coefficient and an optical link between the SS-RSOA and the PRM, and $\exp(-j\omega\tau)$ is a frequency response of the round-trip delay, denoted as $\tau$, between the SS-RSOA and the PRM.

18. The method of claim 14, further comprising:
transmitting, via the SS-RSOA, the optical signal towards the PRM;
receiving, via a photodetector, a feedback signal comprising at least a first portion of the optical signal and at least a second portion of a reflected signal, wherein the reflected signal comprises a third portion of the optical signal reflected from the PRM;
determining an optical-to-optical response of the SS-RSOA according to the feedback signal; and
updating the filter according to the optical-to-optical response of the SS-RSOA.

19. The method of claim 14, further comprising:
transmitting, via the SS-RSOA, the optical signal towards the PRM; and
receiving, via a photodetector, a feedback signal comprising at least a first portion of the optical signal carrying the electrical modulation signal and at least a second portion of a reflected signal, wherein the reflected signal comprises a third portion of the optical signal reflected from the PRM,
wherein generating the cancellation signal comprises filtering the feedback signal by the filter, and
wherein the filter response in a frequency domain is represented by:

$$H(f)=H_e^{-1}(f)H_o(f),$$

where $h_e^{-1}(f)$ is an inverse of an electrical-to-optical response of the SS-RSOA and $H_o(f)$ is an optical-to-optical response of the SS-RSOA.

20. The method of claim 17, further comprising adjusting the attenuation coefficient A according to a bias current of the SS-RSOA.

* * * * *

UNITED STATES PATENT AND TRADEMARK OFFICE
CERTIFICATE OF CORRECTION

PATENT NO. : 9,806,816 B2
APPLICATION NO. : 14/872563
DATED : October 31, 2017
INVENTOR(S) : Ning Cheng Page 1 of 1

It is certified that error appears in the above-identified patent and that said Letters Patent is hereby corrected as shown below:

On the Title Page

On Title page 2, Other Publications, Column 2, Lines 18-19 should read:
Pfeiffer, "Next Generation Mobile Fronthaul Architectures," M2J.7.pdf, Optical Society of America, 3 pages, 2015.

In the Claims

Column 24, Lines 49-56, Claim 13, should read:
13. The apparatus of claim 12, wherein the filter comprises a filter response represented in a frequency domain by:

$$H(f) = H_e^{-1}(f) H_o(f),$$

where $H_e^{-1}(f)$ is an inverse of an electrical-to-optical response of the RSOA and $H_o(f)$ is an optical-to-optical response of the RSOA.

Column 26, Lines 10-28, Claim 19 should read:
19. The method of claim 14, further comprising:
  transmitting, via the SS-RSOA, the optical signal towards the PRM; and
  receiving, via a photodetector, a feedback signal comprising at least a first portion of the optical signal carrying the electrical modulation signal and at least a second portion of a reflected signal, wherein the reflected signal comprises a third portion of the optical signal reflected from the PRM,
  wherein generating the cancellation signal comprises filtering the feedback signal by the filter, and
  wherein the filter response in a frequency domain is represented by:

$$H(f) = H_e^{-1}(f) H_o(f),$$

where $H_e^{-1}(f)$ is an inverse of an electrical-to-optical response of the SS-RSOA and $H_o(f)$ is an optical-to-optical response of the SS-RSOA.

Signed and Sealed this
Thirteenth Day of February, 2018

Andrei Iancu
*Director of the United States Patent and Trademark Office*